United States Patent
Fatemi et al.

(10) Patent No.: US 12,367,375 B2
(45) Date of Patent: Jul. 22, 2025

(54) SYSTEM AND METHOD FOR STRUCTURE LEARNING FOR GRAPH NEURAL NETWORKS

(71) Applicant: ROYAL BANK OF CANADA, Toronto (CA)

(72) Inventors: Bahare Fatemi, Toronto (CA); Seyed Mehran Kazemi, Toronto (CA); Layla El Asri, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 939 days.

(21) Appl. No.: 17/484,363

(22) Filed: Sep. 24, 2021

(65) Prior Publication Data
US 2022/0101103 A1 Mar. 31, 2022

Related U.S. Application Data

(60) Provisional application No. 63/083,199, filed on Sep. 25, 2020.

(51) Int. Cl.
G06N 3/04 (2023.01)
G06N 3/045 (2023.01)

(52) U.S. Cl.
CPC ................... G06N 3/045 (2023.01)

(58) Field of Classification Search
CPC ........ G06N 3/045; G06N 3/042; G06N 3/082; G06N 3/088; G06N 5/022
See application file for complete search history.

(56) References Cited

U.S. PATENT DOCUMENTS

| | | | |
|---|---|---|---|
| 2019/0095806 A1* | 3/2019 | Martinez Canedo | ... G06F 18/21 |
| 2021/0081717 A1* | 3/2021 | Creed | ..... G06N 3/047 |
| 2021/0374499 A1* | 12/2021 | Wu | ......... G06F 17/16 |
| 2022/0012534 A1* | 1/2022 | Zhao | ....... G06F 18/22 |

OTHER PUBLICATIONS

Jin, "Graph Structure Learning for Robust Graph Neural Networks", KDD '20, Aug. 23-27, 2020, Virtual Event, USA. (Year: 2020).*

* cited by examiner

*Primary Examiner* — Dave Misir
(74) *Attorney, Agent, or Firm* — NORTON ROSE FULBRIGHT CANADA LLP

(57) ABSTRACT

A graph structure having nodes and edges is represented as an adjacency matrix, and nodes of the graph structure have node features. A computer-implemented method and system for generating a graph structure are provided, the method comprising: generating an adjacency matrix based on a plurality of node features; generating a plurality of noisy node features based on the plurality of node features; generating a plurality of denoised node features using a neural network based on the plurality of noisy node features and the adjacency matrix; and updating the adjacency matrix based on the plurality of denoised node features.

21 Claims, 20 Drawing Sheets

| Dataset | Nodes | Edges | Classes | Features | Label rate |
|---|---|---|---|---|---|
| Cora | 2,708 | 5,429 | 7 | 1,433 | 0.052 |
| Citeseer | 3,327 | 4,732 | 6 | 3,703 | 0.036 |
| Pubmed | 19,717 | 44,338 | 3 | 500 | 0.003 |
| ogbn-arxiv | 169,343 | 1,166,243 | 40 | 128 | 0.537 |
| Wine | 178 | 0 | 3 | 13 | 0.112 |
| Cancer | 569 | 0 | 2 | 30 | 0.035 |
| Digits | 1,797 | 0 | 10 | 64 | 0.056 |
| 20news | 9,607 | 0 | 10 | 236 | 0.021 |
| MNIST | 10,000 | 0 | 10 | 784 | 0.1, 0.2 and 0.3 |

FIG. 3

| Model | Generator | Cora | Citeseer | Cora390 | Citeseer370 | Pubmed | ogbn-arxiv |
|---|---|---|---|---|---|---|---|
| MLP | | 56.1 ± 1.6† | 56.7 ± 1.7† | 65.8 ± 0.4 | 67.1 ± 0.5 | 71.4 ± 0.0 | 54.7 ± 0.1 |
| MLP-GAM* | | 70.7‡ | 70.3‡ | – | – | 71.9‡ | – |
| LP | | 37.6 ± 0.0 | 23.2 ± 0.0 | 36.2 ± 0.0 | 29.1 ± 0.0 | 41.3 ± 0.0 | OOM |
| kNN-GCN | | 66.5 ± 0.4† | 68.3 ± 1.3† | 72.5 ± 0.5 | 71.8 ± 0.8 | 70.4 ± 0.4 | 49.1 ± 0.3 |
| LDS | | – | – | 71.5 ± 0.8† | 71.5 ± 1.1† | OOM | OOM |
| GRCN | | 67.4 ± 0.3 | 67.3 ± 0.8 | 71.3 ± 0.9 | 70.9 ± 0.7 | 67.3 ± 0.3 | OOM |
| DGCNN | | 56.5 ± 1.2 | 55.1 ± 1.4 | 67.3 ± 0.7 | 60.6 ± 0.8 | 70.1 ± 1.3 | OOM |
| IDGL | | 70.9 ± 0.6 | 68.2 ± 0.6 | 73.4 ± 0.5 | 72.7 ± 0.4 | 72.3 ± 0.4 | OOM |
| SLAPS | FP | 72.4 ± 0.4 | 70.7 ± 0.4 | 76.6 ± 0.4 | 73.1 ± 0.6 | OOM | OOM |
| SLAPS | MLP | 72.8 ± 0.8 | 70.5 ± 1.1 | 75.3 ± 1.0 | 73.0 ± 0.9 | 74.4 ± 0.6 | 56.6 ± 0.1 |
| SLAPS | MLP-D | 73.4 ± 0.3 | 72.6 ± 0.6 | 75.1 ± 0.5 | 73.9 ± 0.4 | 73.1 ± 0.7 | 52.9 ± 0.1 |

FIG. 4A

| Model | Generator | Wine | Cancer | Digits | 20news |
|---|---|---|---|---|---|
| LDS | | 97.3 ± 0.4† | 94.4 ± 1.9† | 92.5 ± 0.7† | 46.4 ± 1.6† |
| IDGL | | 97.0 ± 0.7 | 94.2 ± 2.3 | 92.5 ± 1.3 | 48.5 ± 0.6 |
| SLAPS | FP | 96.6 ± 0.4 | 94.6 ± 0.3 | 94.4 ± 0.7 | 44.4 ± 0.8 |
| SLAPS | MLP | 96.3 ± 1.0 | 96.0 ± 0.8 | 92.4 ± 0.6 | 50.4 ± 0.7 |
| SLAPS | MLP-D | 96.5 ± 0.8 | 96.6 ± 0.2 | 93.2 ± 0.6 | 49.8 ± 0.9 |

FIG. 4B

| Model | Cora | Citeseer | Cora390 | Citeseer370 | Pubmed | ogbn-arxiv |
|---|---|---|---|---|---|---|
| MLP | 56.1 ± 1.6† | 56.7 ± 1.7† | 65.8 ± 0.4 | 67.1 ± 0.5 | 71.4 ± 0.0 | 54.7 ± 0.1 |
| MLP-GAM* | 70.7‡ | 70.3‡ | — | — | 71.9‡ | — |
| LP | 37.6 ± 0.0 | 23.2 ± 0.0 | 36.2 ± 0.0 | 29.1 ± 0.0 | 41.3 ± 0.0 | OOM |
| kNN-GCN | 66.5 ± 0.4† | 68.3 ± 1.3† | 72.5 ± 0.5 | 71.8 ± 0.8 | 70.4 ± 0.4 | 49.1 ± 0.3 |
| LDS | — | — | 71.5 ± 0.8† | 71.5 ± 1.1† | OOM | OOM |
| GRCN | 67.4 ± 0.3 | 67.3 ± 0.8 | 71.3 ± 0.9 | 70.9 ± 0.7 | 67.3 ± 0.3 | OOM |
| DGCNN | 56.5 ± 1.2 | 55.1 ± 1.4 | 67.3 ± 0.7 | 66.6 ± 0.8 | 70.1 ± 1.3 | OOM |
| IDGL | 70.9 ± 0.6 | 68.2 ± 1.0 | 73.4 ± 0.5 | 72.7 ± 0.4 | 72.3 ± 0.4 | OOM |
| kNN-GCN + AdaEdge | 67.7 ± 1.0 | 68.8 ± 1.0 | 72.2 ± 0.4 | 71.8 ± 0.6 | OOT | OOT |
| kNN-GCN + self-training | 67.3 ± 0.3 | 69.8 ± 1.0 | 71.1 ± 0.3 | 72.4 ± 0.2 | 72.7 ± 0.1 | NA |
| SLAPS (FP) | 72.4 ± 0.4 | 70.7 ± 0.4 | 76.6 ± 0.4 | 73.1 ± 0.6 | OOM | OOM |
| SLAPS (MLP) | 72.8 ± 0.8 | 70.5 ± 1.1 | 75.3 ± 1.0 | 73.0 ± 0.9 | 74.4 ± 0.6 | 56.6 ± 0.1 |
| SLAPS (MLP-D) | 73.4 ± 0.3 | 72.6 ± 0.6 | 75.1 ± 0.5 | 73.9 ± 0.4 | 73.1 ± 0.7 | 52.9 ± 0.1 |
| SLAPS (MLP) + AdaEdge | 72.8 ± 0.7 | 70.6 ± 1.5 | 75.2 ± 0.6 | 72.6 ± 1.4 | OOT | OOT |
| SLAPS (MLP) + self-training | 74.2 ± 0.5 | 73.1 ± 1.0 | 75.5 ± 0.7 | 73.3 ± 0.6 | 74.3 ± 1.4 | NA |

FIG. 4C

| Model | Wine | Cancer | Digits | 20news |
|---|---|---|---|---|
| MLP | 96.1 ± 1.0 | 95.3 ± 0.9 | 81.9 ± 1.0 | 30.4 ± 0.1 |
| kNN-GCN | 93.5 ± 0.7 | 95.3 ± 0.4 | 95.4 ± 0.4 | 46.3 ± 0.3 |
| LDS | 97.3 ± 0.4† | 94.4 ± 1.9† | 92.5 ± 0.7† | 46.4 ± 1.6† |
| IDGL | 97.0 ± 0.7 | 94.2 ± 2.3 | 92.5 ± 1.3 | 48.5 ± 0.6 |
| SLAPS (FP) | 96.6 ± 0.4 | 94.6 ± 0.3 | 94.4 ± 0.7 | 44.4 ± 0.8 |
| SLAPS (MLP) | 96.3 ± 1.0 | 96.0 ± 0.8 | 92.5 ± 0.7 | 50.4 ± 0.7 |
| SLAPS (MLP-D) | 96.5 ± 0.8 | 96.6 ± 0.2 | 94.2 ± 0.1 | 49.8 ± 0.9 |

FIG. 4D

Best set of hyperparameters for different datasets chosen on validation set.

| Dataset | Generator | $lr_C$ | $lr_{DAE}$ | $dropout_c$ | $dropout_{DAE}$ | $k$ | $\lambda$ | $r$ | $\eta$ |
|---|---|---|---|---|---|---|---|---|---|
| Cora | FP | 0.001 | 0.01 | 0.5 | 0.25 | 30 | 10 | 10 | 5 |
| Cora | MLP | 0.01 | 0.001 | 0.25 | 0.5 | 20 | 10 | 10 | 5 |
| Cora | MLP-D | 0.01 | 0.001 | 0.25 | 0.5 | 15 | 10 | 10 | 5 |
| Citeseer | FP | 0.01 | 0.01 | 0.5 | 0.5 | 30 | 1 | 10 | 1 |
| Citeseer | MLP | 0.01 | 0.001 | 0.25 | 0.5 | 30 | 10 | 10 | 5 |
| Citeseer | MLP-D | 0.001 | 0.01 | 0.5 | 0.5 | 20 | 10 | 10 | 5 |
| Cora390 | FP | 0.01 | 0.01 | 0.25 | 0.5 | 20 | 100 | 10 | 5 |
| Cora390 | MLP | 0.01 | 0.001 | 0.25 | 0.5 | 20 | 10 | 10 | 5 |
| Cora390 | MLP-D | 0.001 | 0.001 | 0.25 | 0.5 | 20 | 10 | 10 | 5 |
| Citeseer370 | FP | 0.01 | 0.01 | 0.5 | 0.5 | 30 | 1 | 10 | 1 |
| Citeseer370 | MLP | 0.01 | 0.001 | 0.25 | 0.5 | 30 | 10 | 10 | 5 |
| Citeseer370 | MLP-D | 0.01 | 0.01 | 0.25 | 0.5 | 20 | 10 | 10 | 5 |
| Pubmed | MLP | 0.01 | 0.01 | 0.5 | 0.5 | 15 | 10 | 10 | 5 |
| Pubmed | MLP-D | 0.01 | 0.01 | 0.25 | 0.25 | 15 | 100 | 5 | 5 |
| ogbn-arxiv | MLP | 0.01 | 0.001 | 0.25 | 0.5 | 15 | 10 | 1 | 5 |
| ogbn-arxiv | MLP-D | 0.01 | 0.001 | 0.5 | 0.25 | 15 | 10 | 1 | 5 |
| Wine | FP | 0.01 | 0.001 | 0.5 | 0.5 | 20 | 0.1 | 5 | 5 |
| Wine | MLP | 0.01 | 0.001 | 0.5 | 0.25 | 20 | 0.1 | 5 | 5 |
| Wine | MLP-D | 0.01 | 0.01 | 0.25 | 0.5 | 10 | 1 | 5 | 5 |
| Cancer | FP | 0.01 | 0.001 | 0.5 | 0.25 | 20 | 0.1 | 5 | 5 |
| Cancer | MLP | 0.01 | 0.001 | 0.5 | 0.5 | 20 | 1.0 | 5 | 5 |
| Cancer | MLP-D | 0.01 | 0.01 | 0.5 | 0.5 | 20 | 0.1 | 5 | 5 |
| Digits | FP | 0.01 | 0.001 | 0.25 | 0.5 | 20 | 0.1 | 5 | 5 |
| Digits | MLP | 0.01 | 0.001 | 0.25 | 0.5 | 20 | 10 | 5 | 5 |
| Digits | MLP-D | 0.01 | 0.001 | 0.5 | 0.25 | 15 | 0.1 | 5 | 5 |
| 20news | FP | 0.01 | 0.01 | 0.5 | 0.5 | 20 | 500 | 5 | 5 |
| 20news | MLP | 0.001 | 0.001 | 0.25 | 0.5 | 20 | 500 | 5 | 5 |
| 20news | MLP-D | 0.01 | 0.01 | 0.25 | 0.25 | 20 | 100 | 5 | 5 |
| MNIST (1000) | MLP | 0.01 | 0.01 | 0.5 | 0.5 | 15 | 10 | 10 | 5 |
| MNIST (2000) | MLP-D | 0.01 | 0.001 | 0.5 | 0.5 | 15 | 100 | 10 | 5 |
| MNIST (3000) | MLP | 0.01 | 0.01 | 0.5 | 0.5 | 15 | 10 | 5 | 5 |

FIG. 4E

SYSTEM AND METHOD FOR STRUCTURE LEARNING FOR GRAPH NEURAL NETWORKS

CROSS-REFERENCE TO RELATED APPLICATION

This application claims priority to and benefit of U.S. provisional patent application No. 63/083,199 filed on Sep. 25, 2020, the entire content of which is incorporated herein by reference.

FIELD

This disclosure relates to neural networks based on graph structures, and in particular, graph neural networks.

BACKGROUND

Over the past few years, graph representation learning has grown rapidly and found applications in domains where data points define a graph [2, 23]. Graph neural networks (GNNs) [35] have been a key component to the success of the research in this area. Specifically, GNNs have shown promising results for semi-supervised classification when the available graph structure exhibits a high degree of homophily (i.e., connected nodes often belong to the same class) [52].

Graph neural networks (GNNs) take as input a set of node features and an adjacency matrix corresponding to the graph structure and output an embedding for each node that captures not only the initial features of the node but also the features of its neighbours. The need for both node features and graph structure limits the applicability of GNNs in several domains. For example, one may have access to a set of node (or object) features and hypothesize that there exists some relation between the nodes, but not have access to the graph structure specifying which pairs of nodes are connected.

SUMMARY

According to an aspect, there is provided a computer-implemented system for generating a graph structure represented as an adjacency matrix, nodes of the graph structure having node features, the system may include: at least one processor; and memory in communication with said at least one processor, wherein the memory stores instructions when executed at said at least one processor causes said system to: generate an adjacency matrix based on a plurality of node features; generate a plurality of noisy node features based on the plurality of node features; generate a plurality of denoised node features using a first neural network based on the plurality of noisy node features and the adjacency matrix; and update the adjacency matrix based on the plurality of denoised node features.

In some embodiments, the instructions when executed at said at least one processor causes said system to: compute, using a second neural network, one or more class labels based on the plurality of node features and the adjacency matrix.

In some embodiments, the adjacency matrix is a normalized adjacency matrix.

In some embodiments, the first neural network is a graph neural network (GNN).

In some embodiments, the first neural network is a denoising autoencoder (DAE).

In some embodiments, the first neural network $GNN_{DAE}$ has a loss function $\mathcal{L}_{DAE}$ determined based on the plurality of noisy node features and parameters of the first neural network $GNN_{DAE}$.

In some embodiments, the loss function $\mathcal{L}_{DAE}$ is represented by the function $$\mathcal{L}_{DAE} = L(X_{idx}, GNN_{DAE}(\tilde{X}, A; \theta_{GNN_{DAE}})_{idx}),$$

where A represents the generated adjacency matrix, $\theta_{GNN_{DAE}}$ represents parameters of the first neural network $GNN_{DAE}$, X represents the plurality of node features, $\tilde{X}$ represents the plurality of noisy node features, idx represent indices corresponding to the elements of X to which noise has been added, and $X_{idx}$ represent corresponding values of elements at idx.

In some embodiments, the instructions when executed at said at least one processor causes said system to update one or more parameters of the first neural network $GNN_{DAE}$ by minimizing the loss function $\mathcal{L}_{DAE}$.

In some embodiments, the loss function $\mathcal{L}_{DAE}$ is determined based on a binary cross-entropy loss or a mean-squared error loss.

In some embodiments, the instructions when executed at said at least one processor causes said system to update one or more parameters of the first and second neural networks by minimizing a combined loss determined based on $\mathcal{L}_C$ and $\mathcal{L}_{DAE}$, wherein $\mathcal{L}_C$ represents a loss function of the second neural network.

In some embodiments, the combined loss is determined based on a combined loss function $\mathcal{L} = \mathcal{L}_C + \lambda \mathcal{L}_{DAE}$, wherein $\mathcal{L}_C$ represents a loss function of the first neural network, and $\lambda$ is a hyperparameter controlling a relative importance between $\mathcal{L}_C$ and $\mathcal{L}_{DAE}$.

In some embodiments, generating the adjacency matrix is based on a multi-layer perceptron (MLP) with k nearest neighbors.

In some embodiments, generating the adjacency matrix can be performed by a generator function $G: \mathbb{R}^{n \times f} \to \mathbb{R}^{n \times n}$ with parameters $\theta_G$, wherein the generator function G is configured to receive the plurality of node features $X \in \mathbb{R}^{n \times f}$ as input and to output the adjacency matrix $\tilde{A} \in \mathbb{R}^{n \times n}$, and the parameters $\theta_G$ corresponds to weights of the MLP: $\mathbb{R}^{n \times f} \to \mathbb{R}^{n \times fi}$.

According to an aspect, there is provided a computer-implemented method for generating a graph structure represented as an adjacency matrix, the method may include: generating an adjacency matrix based on a plurality of node features; generating a plurality of noisy node features based on the plurality of node features; generating a plurality of denoised node features using a neural network based on the plurality of noisy node features and the adjacency matrix; and updating the adjacency matrix based on the plurality of denoised node features.

In some embodiments, the method may include computing, using a second neural network, one or more class labels based on the plurality of node features and the adjacency matrix.

In some embodiments, the adjacency matrix is a normalized adjacency matrix.

In some embodiments, the first neural network comprises a graph neural network (GNN).

In some embodiments, the first neural network comprises a denoising autoencoder (DAE).

In some embodiments, the second neural network comprises a two-layer graph convolutional network (GCN).

In some embodiments, the first neural network $GNN_{DAE}$ has a loss function $\mathcal{L}_{DAE}$ determined based on the plurality of noisy node features and parameters of the first neural network $GNN_{DAE}$.

In some embodiments, the loss function $\mathcal{L}_{DAE}$ is represented by the function $$\mathcal{L}_{DAE}=L(X_{idx}, GNN_{DAE}(\tilde{X}, A; \theta_{GNN_{DAE}})_{idx}),$$

where A represents the generated adjacency matrix, $\theta_{GNN_{DAE}}$ represents parameters of the first neural network $GNN_{DAE}$, X represents the plurality of node features, $\tilde{X}$ represents the plurality of noisy node features, idx represent indices corresponding to the elements of X to which noise has been added, and $X_{idx}$ represent corresponding values of elements at idx.

In some embodiments, the method may include updating one or more parameters of the first neural network $GNN_{DAE}$ by minimizing the loss function $\mathcal{L}_{DAE}$.

In some embodiments, the loss function $\mathcal{L}_{DAE}$ may be determined based on a binary cross-entropy loss or a mean-squared error loss.

In some embodiments, the method may include updating one or more parameters of the first and second neural networks by minimizing a combined loss determined based on $\mathcal{L}_C$ and $\mathcal{L}_{DAE}$, wherein $\mathcal{L}_C$ represents a loss function of the second neural network.

In some embodiments, the combined loss is determined based on a combined loss function $\mathcal{L} = \mathcal{L}_C + \lambda \mathcal{L}_{DAE}$, wherein $\mathcal{L}_C$ represents a loss function of the first neural network, and $\lambda$ is a hyperparameter controlling a relative importance between $\mathcal{L}_C$ and $\mathcal{L}_{DAE}$.

In some embodiments, generating the adjacency matrix is based on a multi-layer perceptron (MLP) with k nearest neighbors.

In some embodiments, generating the adjacency matrix can be performed by a generator function $G: \mathbb{R}^{n \times f} \to \mathbb{R}^{n \times n}$ with parameters $\theta_G$, wherein the generator function G is configured to receive the plurality of node features $X \in \mathbb{R}^{n \times f}$ as input and to output the adjacency matrix $\tilde{A} \in \mathbb{R}^{n \times n}$, and the parameters $\theta_G$ corresponds to weights of the MLP: $\mathbb{R}^{n \times f} \to \mathbb{R}^{n \times fi}$.

According to yet another aspect, there is provided a non-transitory computer-readable storage medium storing a data model representing a neural network for generating a graph structure, and the neural network is trained by: generating an adjacency matrix based on a plurality of node features; generating a plurality of noisy node features based on the plurality of node features; generating a plurality of denoised node features using the neural network based on the plurality of noisy node features and the adjacency matrix; and updating the adjacency matrix based on the plurality of denoised node features.

In some embodiments, the storage medium further stores the adjacency matrix updated by the neural network.

Other features will become apparent from the drawings in conjunction with the following description.

BRIEF DESCRIPTION OF DRAWINGS

In the figures which illustrate example embodiments,

FIG. 3 shows tables of dataset statistics based on different graph structure learning models;

FIGS. 4A to 4D are tables of experimental results of a graph structure learning model as compared to benchmark datasets;

FIG. 4E shows a table listing a set of hyperparameters for different datasets chosen on validation set;

DETAILED DESCRIPTION

Figure 1A:
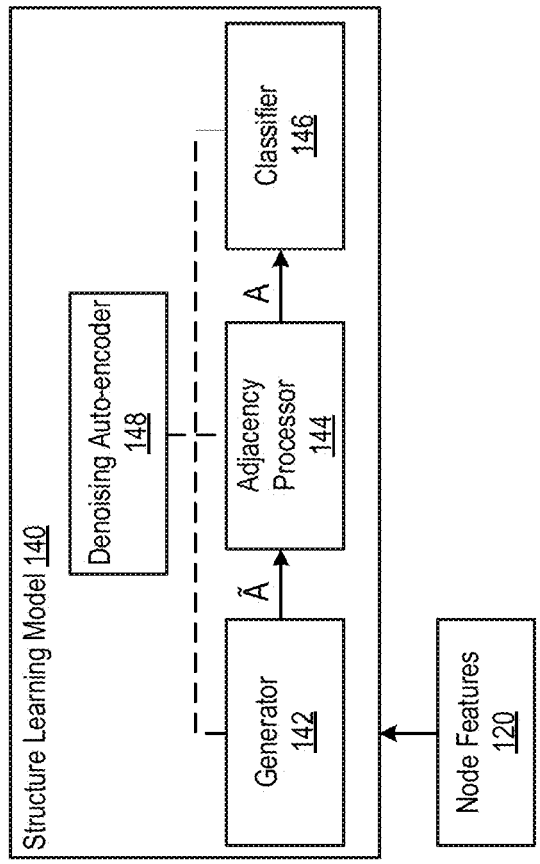
FIG. 1A is a simplified block diagram of a structure learning system for graph neural networks (GNNs), according to an embodiment.

A graph can be represented as a data structure consisting of two components: nodes (vertices) and edges. A graph is often represented by an adjacency matrix. Graph neural networks (GNNs) are a class of machine learning models designed to perform inference on data described by graphs. GNNs can often be directly applied to graphs, and provide an easy way to do node-level, edge-level, and graph-level prediction tasks.

GNNs can be used in a number of real world applications, such as, for instance, Natural Language Processing (NLP), computer vision (e.g., object detection), traffic control, and property valuation. For example, GNN can utilize relations of words or documents to predict one or more categories, or can also build a syntactic model by looking at different parts of a sentence. For another example, GNN can be used in computer vision to model relationships between objects detected by a convolutional neural network (CNN) based detector. After objects are detected by the CNN from the images, a GNN can be used to generate graph that models the relationships between different objects (e.g., object A is behind object B).

In the implementation of GNNs, an input is a set of node features and a graph structure (for example, modeled as adjacency matrix). In some domains or scenarios, a graph structure may not be available indicating the relationship between nodes, and a graph may be generated based on a similarity metric. However, such a graph structure may be noisy, and if a graph structure is noisy, the performance of the GNN can degrade quickly.

GNNs work well when the graph structure is provided. However, this structure may not always be available in real-world applications. One solution to this problem is to infer a task-specific latent structure and then apply a GNN to the inferred graph. Unfortunately, the space of possible graph structures grows super-exponentially with the number of nodes and so the task-specific supervision may be insufficient for learning both the structure and the GNN parameters. In this disclosure, Simultaneous Learning of Adjacency and GNN Parameters with Self-supervision, or SLAPS, is described in detail, which may include a system and method that provides more supervision for inferring a graph structure through self-supervision. A comprehensive experimental study demonstrates that SLAPS scales to large graphs with hundreds of thousands of nodes and outperforms several models that have been proposed to learn a task-specific graph structure on established benchmarks.

Techniques disclosed herein may address the aforementioned limitation by learning both the GNN parameters as well as an adjacency matrix simultaneously. Since obtaining labels is typically costly, and the number of labels may be limited for learning both GNN parameters and an adjacency matrix especially for semi-supervised node classification, the main classification task may be supplemented with a novel self-supervised task that helps learn a better adjacency matrix.

In some embodiments, a system is implemented to leverage the applicability of GNNs to (semi-supervised) classification problems where a graph structure is not readily available. The existing approaches for this problem either fix a similarity graph between the nodes, or learn the GNN parameters and a graph structure simultaneously. In both cases, one main goal is to construct or learn a graph structure with a high degree of homophily with respect to the labels to aid the GNN classification. The latter approach is sometimes called latent graph learning and often results in higher predictive performance compared to the former approach (see, e.g., [10]).

The described embodiments solve a supervision starvation problem in latent graph learning approaches in which the edges between pairs of nodes that are far from labeled nodes receive insufficient supervision; this results in learning poor structures away from labeled nodes and hence poor generalization. For example, the example embodiments can provide a solution for this problem by adopting a multi-task learning framework in which the classification task is supplemented with a self-supervised task. The self-supervised task is based on the hypothesis that a graph structure that is suitable for predicting the node features is also suitable for predicting the node labels. It works by masking some input features (or adding noise to them) and training a separate GNN aiming at updating the adjacency matrix in such a way that it can recover the masked (or noisy) features. The task is generic and can be combined with several existing latent graph learning approaches.

In some embodiments, a system may include a latent graph learning model, ("SLAPS"), that adopts the self-supervised task. A comprehensive experimental study on nine datasets (thirteen variations) of various sizes and from various domains and perform thorough analyses to show the merit of SLAPS is also provided in this disclosure.

Embodiments of a self-supervision approach disclosed herein masks some input features (or adds noise to them) and trains a separate GNN aiming at updating the adjacency matrix in such a way that it can recover the masked (or noisy) features. The introduction of this task may be based on the assumption that a graph structure suitable for predicting the node features is also suitable for predicting the node labels.

As described in further detail below, experimental work has been performed on several benchmark datasets for graph representation learning by feeding only the node features to a structure learning model, as disclosed herein. Embodiments of a structure learning model learn a GNN that operates on the node features and an adjacency that is learned simultaneously from data. It is shown that a structure learning model, as disclosed herein, may achieve promising results without having access to the graph structure. It is also shown that a self-supervised task may improve performance of a structure learning model.

There has recently been a surge of interest in graph representation learning with GNNs at the forefront of the developments. Most existing GNN models assume a graph structure is provided as input.

A possible solution for domains where a graph structure is not available is to decide on a c, or to connect pairs of nodes whose similarity surpasses some predefined threshold (see, e.g., [34]). With this approach, however, the quality of the predictions depends heavily on the choice of the similarity metric and the value of k. Furthermore, designing an appropriate similarity metric may not be straightforward in some applications.

Another possible solution is to assume a fully-connected graph and employ GNN variants such as graph attention networks and transformer that infer the graph structure through an attention mechanism. The complexity of such approaches grows rapidly, making them applicable only to small-sized graphs with only a few thousand nodes. As an example, for natural language processing, the number of tokens (corresponding to nodes) in the input of transformer models is typically limited to 512.

Recently, a model named LDS with a bi-level optimization setup for simultaneously learning the GNN parameters and an adjacency matrix is disclosed in [10]. However, some parameters in the adjacency matrix of LDS receive no supervision. This is problematic as it makes some portions of the learned adjacency matrix to be mainly a function of the initialization and not a function of an optimization criteria. Another recent related work is the GRCN model of [4] who employ a generator GNN that takes the node features and an initial graph structure as input and provides a revised graph structure that is then used for classification by a second GNN. Their approach, however, relies on a relatively accurate initial graph structure to be fed into the generator GNN.

Self-supervision techniques may be inspired by the successful training procedures of several recent language models such as BERT and RoBERTa. Similar self-supervision techniques have been also employed for GNNs. For traditional techniques, with an adjacency matrix modelling the graph structure as input, the adjacency matrix is fixed. Only parameters of the GNN are learned, and thus may not overcome limitations of incomplete or noisy graph structure.

Techniques disclosed herein may be used to initialize an adjacency matrix with some structure, and allow it to be further learned. Thus, not only are GNN parameters learned, but structure in an adjacency matrix is learned as well. Learning the adjacency matrix may capture missing structure from the graph.

Conveniently, if starting with a noise graph structure, an advantage of letting that structure be learned (in an example, at the same time as the GNN parameters), potentially edges of the graph structure can be removed that should be there (initially present due to noise), and missing edges can be added (that were initially missing due to noise). The results detailed herein illustrated that, in some embodiments, such learning can generate improved results.

As used herein throughout the disclosure, lowercase letters denote scalars, bold lowercase letters denote vectors and bold uppercase letters denote matrices. I represents an identity matrix. For a vector $\mathbf{v}$, its $i^{th}$ element is represented as $\mathbf{v}_i$ and for a matrix M, its element at the $i^{th}$ row and $j^{th}$ column is represented as $M_{ij}$. For an attributed graph, n, m and f are used to represent the number of nodes, edges, and features respectively and the graph is denoted as $\mathcal{G}=\{\mathcal{V}, A, X\}$ where: $\mathcal{V}=\{v_1, \ldots, v_n\}$ is a set of nodes; $A \in \mathbb{R}^{n \times n}$ is a set of edges, or $A \in \mathbb{R}^{n \times n}$ can also represent an adjacency matrix with $A_{ij}$ indicating the weight of the edge from $v_i$ to $v_j$ ($A_{ij}$=0 implies no edge); and $X \in \mathbb{R}^{n \times f}$ is a matrix whose rows correspond to node features/attributes. A degree matrix D for graph $\mathcal{G}$ is a diagonal matrix where $D_{ii}=\Sigma_j A_{ij}$.

Graph convolutional networks (GCNs) are a powerful variant of GNNs [24]. For a graph $\mathcal{G}=\{\mathcal{V}, A, X\}$ with degree matrix D, one layer (e.g., layer l) of the GCN architecture can be defined as follows:

$$H^{(l)}=\sigma(\hat{A}H^{(l-1)}W^{(l)}) \quad (1)$$

where $\hat{A}$ represents a normalized adjacency matrix, $H^{(l-1)} \in \mathbb{R}^{n \times d_{l-1}}$ represents the node representations in layer l-1 ($H^{(0)}=X$), $W^{(l)} \in \mathbb{R}^{d_{l-1} \times d_l}$ is a weight matrix, $\sigma$ is an activation function such as ReLU [30], and $H^{(l)} \in \mathbb{R}^{n \times d_l}$ is the updated node embeddings.

For undirected graphs where the adjacency is symmetric, $$\hat{A} = D^{-\frac{1}{2}}(A+I)D^{-\frac{1}{2}}$$

corresponds to a row-and-column normalized adjacency with self-loops, and for directed graphs where the adjacency is not necessarily symmetric, $\hat{A}=D^{-1}(A+I)$ corresponds to a row normalized adjacency matrix with self-loops. Here, D is a (diagonal) degree matrix for (A+I) defined as $D_{ii}=1+\Sigma_j A_{ij}$.

FIG. 1A illustrates a system 100 for structure learning, in an embodiment. As shown in FIG. 1A, system 100 includes a structure learning model 140 and an input set of node features 120.

System 100 includes a structure learning model 140, also referred to as "Simultaneous Learning of Adjacency and Parameters with Self-supervision for GNNs", or "SLAPS", herein.

Structure learning model 140 can include a generator 142, an adjacency processor or normalizer 144, a classifier 146, and a denoising auto-encoder 148. Generator 142 takes a plurality of node features 120 as input and generates a (perhaps sparse, unnormalized and non-symmetric) matrix $\tilde{A} \in \mathbb{R}^{n \times n}$, an adjacency matrix corresponding to a graph structure. $\tilde{A}$ is then fed into the adjacency processor 144 which outputs $A \in \mathbb{R}^{n \times n}$ corresponding to a normalized, and in some cases symmetric, version of $\tilde{A}$. Classifier 146 can be a GNN which receives the normalized adjacency matrix A and the node features 120 as input and classifies the nodes into a set of predefined classes. Each component is described in more detail below. In some embodiments, the Generator 142 may be a GCN, and in particular, a two-layer GCN.

Figure 1B:
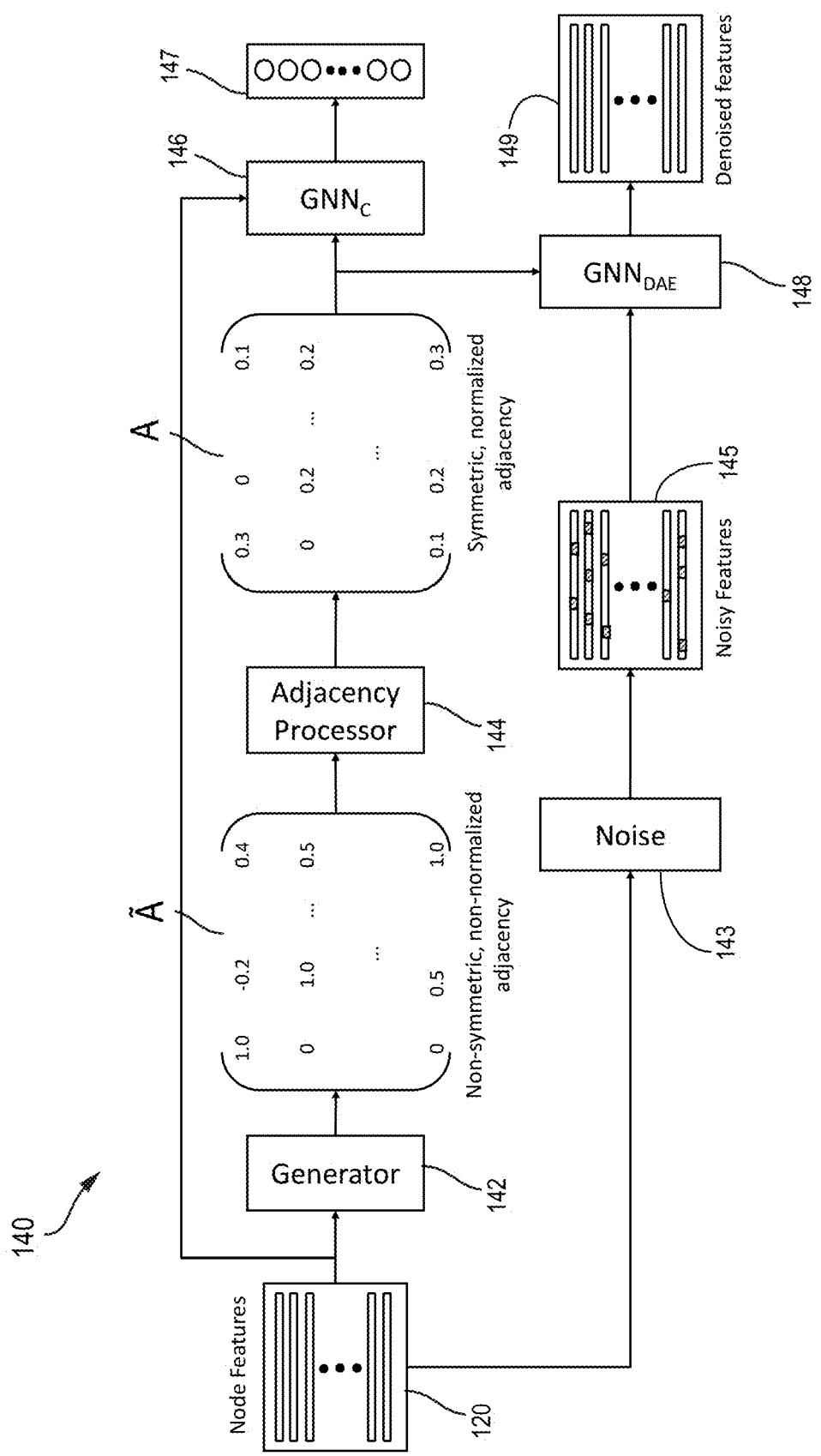
FIG. 1B is a schematic diagram of an implementation of a graph structure learning model, according to an embodiment.

FIG. 1B illustrates an implementation of structure learning model 140, in an example embodiment. Generator 142 receives a plurality of node features 120 and generates a non-symmetric, non-normalized adjacency matrix $\tilde{A}$. Adjacency processor 144 receives adjacency matrix $\tilde{A}$ and normalizes it to generate a symmetric, normalized adjacency matrix A. Classifer 146, illustrated as "$GNN_C$", receives the node features 120 and normalized adjacency matrix A to output node classes 147, for example, a prediction of one or more classes for each node. Denoising auto-encoder 148, illustrated as "$GNN_{DAE}$" receives noisy node features 145, which are generated by adding noise 143 to the node features 120, as well as the normalized adjacency matrix A, to output denoised (or de-noised) node features 149. The denoised node features 149, in a similar fashion as the node features 120, may be processed to generate another non-normalized adjacency matrix $\tilde{A}'$ (not illustrated) and in turn, another normalized adjacency matrix A' (not illustrated).

The plurality of node features 120 may include a feature for each node, and each feature may include one or more data elements (e.g., a vector) associated with the respective node. For example, when a GNN is used to forecast traffic congestion or traffic speed, the traffic network can be a spatial-temporal graph where the nodes are speed sensors installed on roads, the edges are measured by the distance between pairs of nodes, and each node may have a node feature including a data value representing a traffic speed measured at a specific point in time, or during a specific time window. For another example, when a GNN is used to perform natural language processing, the node features may include each word within a sentence. For yet another example, when a GNN (e.g., a GCN) is used to perform property valuation, each node may represent a property, and its associated node feature may be a vector including a number of data elements representing one or more of: property location, type of property, number of bedrooms, build year, historical sold price(s), and so on.

In some embodiments, generator 142 is based on a function $G: \mathbb{R}^{n \times f} \to \mathbb{R}^{n \times n}$ with parameters $\theta_G$ that takes the node features 120 X as input and produces a matrix $\tilde{A} \in \mathbb{R}^{n \times n}$ as output. In some embodiments, generator 142 may include full parametrization or MLP-kNN. In other embodiments, more sophisticated graph generators (e.g., [40, 26, 25]) and models with tractable adjacency computations (e.g., [5]) may be implemented as generator 142.

For a full parametrization (FP) implementation of generator 142, $\theta_G \in \mathbb{R}^{n \times n}$ and the generator function is defined as follows: $\tilde{A}=G_{FP}(X; \theta_G)=\theta_G$. That is, generator 142 ignores the input node features 120 (e.g., node features 120 are not used as input to generator 142) and directly optimizes the adjacency matrix. Using this embodiment of generator 142, one main advantage is that the adjacency may be easily initialized to any predefined value (e.g., to a kNN graph). The disadvantages of this embodiment may include adding $n^2$ parameters to the model and not being applicable to inductive settings where at the test time predictions are to be made for nodes unseen during training.

In another embodiment of generator 142, $\theta_G$ corresponds to the weights of a multi-layer perceptron (MLP) and $\tilde{A}=G_{MLP}(X; \theta_G)=kNN(MLP(X))$, where node features 120 are input to generator 142, and the k value specifies what k to use for k nearest neighbor. In some embodiments, MLP: $\mathbb{R}^{n \times f} \to \mathbb{R}^{n \times f'}$ is an MLP that produces a matrix with updated node features X' and kNN: $\mathbb{R}^{n \times f'} \to \mathbb{R}^{n \times n}$ produces a sparse matrix $\tilde{A}$ based on X' where $\tilde{A}_{ij}=sim(X'_i, X'_j)$ if $v_i$ is among the top k similar nodes to $v_j$ based on a similarity function sim; otherwise $\tilde{A}_{ij}=0$. Recall that $v_i$ and $v_j$ correspond to the $i^{th}$ and $j^{th}$ nodes in the graph respectively. Unlike the full parametrization embodiment of generator 142, this embodiment of generator 142 can be used for the inductive setting, however initializing adjacency matrix to some predefined values may not be straightforward, which is discussed next.

Let $A^{kNN}$ represent an adjacency matrix created by applying a kNN function on the initial node features 120. One method of initialization for $\theta_G$ is to initialize it in a way that the generator initially generates $A^{kNN}$ (i.e. $\tilde{A}=A^{kNN}$ before training starts). This can be done for the FP generator by initializing $\theta_G$ to $A^{kNN}$. For MLP-kNN, two example embodiments may be implemented. In the first example embodiment, hereafter referred to simply as MLP, the input dimension can be kept the same throughout the layers. In the second example embodiment, hereafter referred to as MLP-D, MLPs with diagonal weight matrices (i.e., except the main diagonal, all other parameters in the weight matrices are zero) are used. For both embodiments, the weight matrices in $\theta_G$ can be initialized with the identity matrix to ensure that the output of the MLP is initially the same as its input, and the kNN graph created on these outputs is equivalent to $A^{kNN}$. Alternatively, one may use other MLP variants but pre-train the weights to output $A^{kNN}$ before the main training starts. MLP-D can be thought of as assigning different weights to different features and then computing node similarities.

In some embodiments where a kNN is implemented to sparsify the generated graph, blocking the gradient flow can be avoided. Let $M \in \mathbb{R}^{n \times n}$ with $M_{ij}=1$ if $\mathcal{V}_j$ is among the top k similar nodes to $\mathcal{V}_i$ and 0 otherwise, and let $S \in \mathbb{R}^{n \times n}$ with $S_{ij}=\text{Sim}(X_i', X_j')$ for some differentiable similarity function Sim (e.g., a cosine function). Then $\tilde{A}=\text{kNN}(X')=M \odot S$ where $\odot$ represents the Hadamard (element-wise) product. With this formulation, in the forward phase of the network, one can first compute the matrix M using a k-nearest neighbors algorithm and then compute the similarities in S only for pairs of nodes where $M_{ij}=1$. In some embodiments, exact k-nearest neighbors are computed; one can approximate it using locality-sensitive hashing approaches for larger graphs (see, e.g., [13, 58]). In the backward phase of the generator 142, the gradients are computed only with respect to those elements in S whose corresponding value in M is 1 (i.e., elements $S_{ij}$ such that $M_{ij}=1$); the gradient with respect to the other elements is 0. Since S is computed based on X', the gradients flow to the elements in X' (and consequently to the weights of the MLP) through S.

Figure 7A:
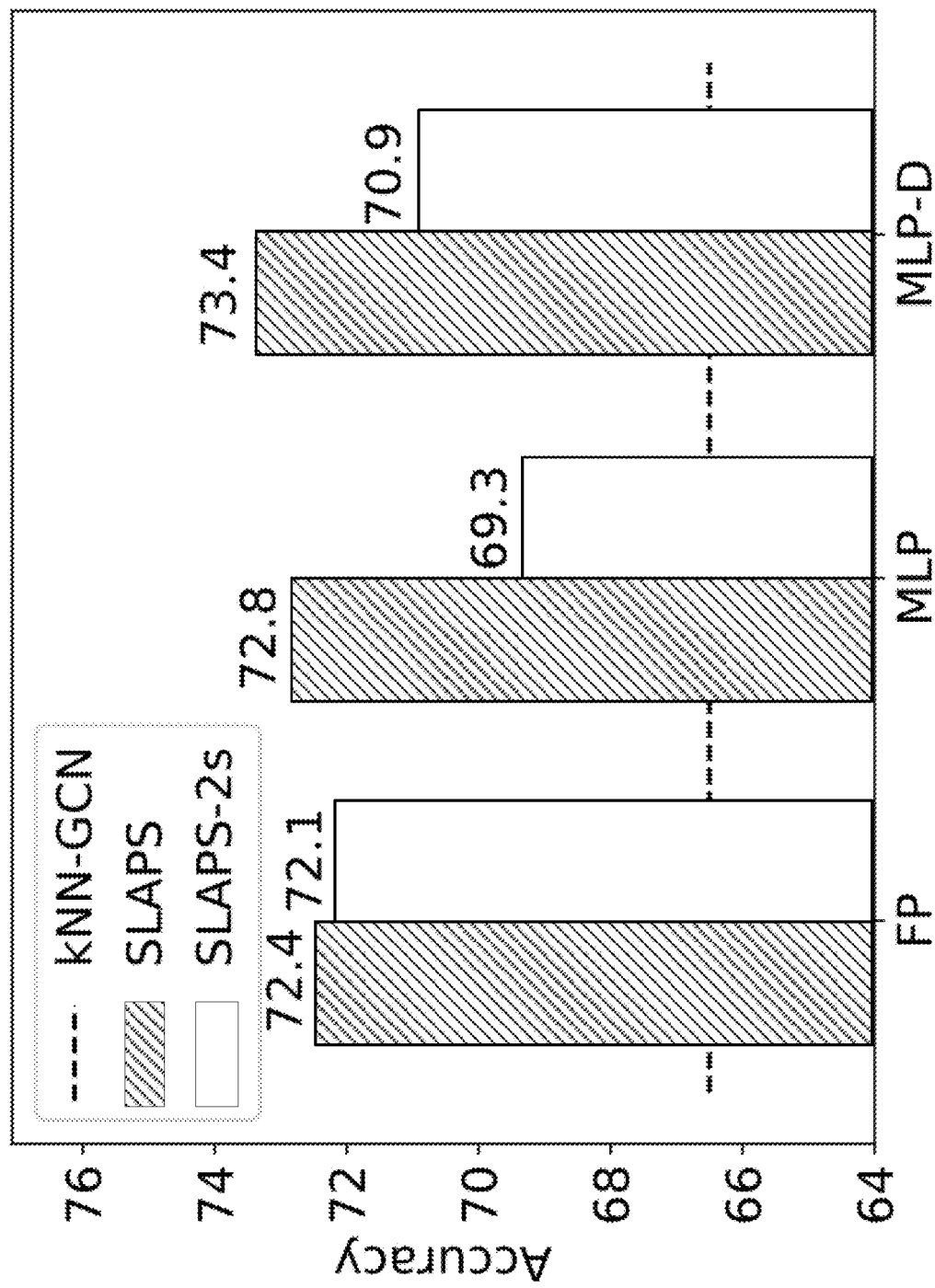
FIGS. 7A to 7G show various dataset statistics based on different graph structure learning models.
Figure 7B:
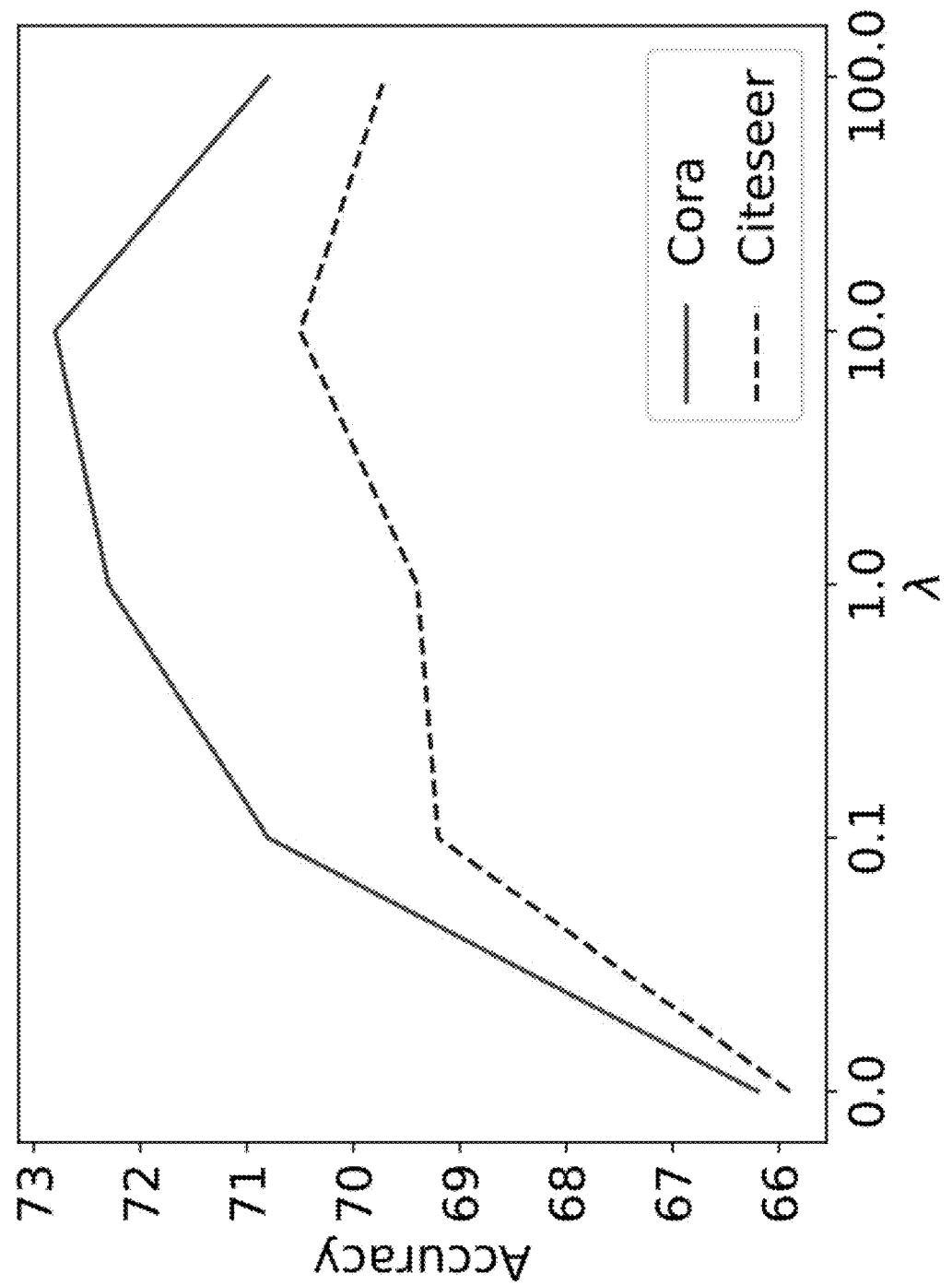
Figure 7C:
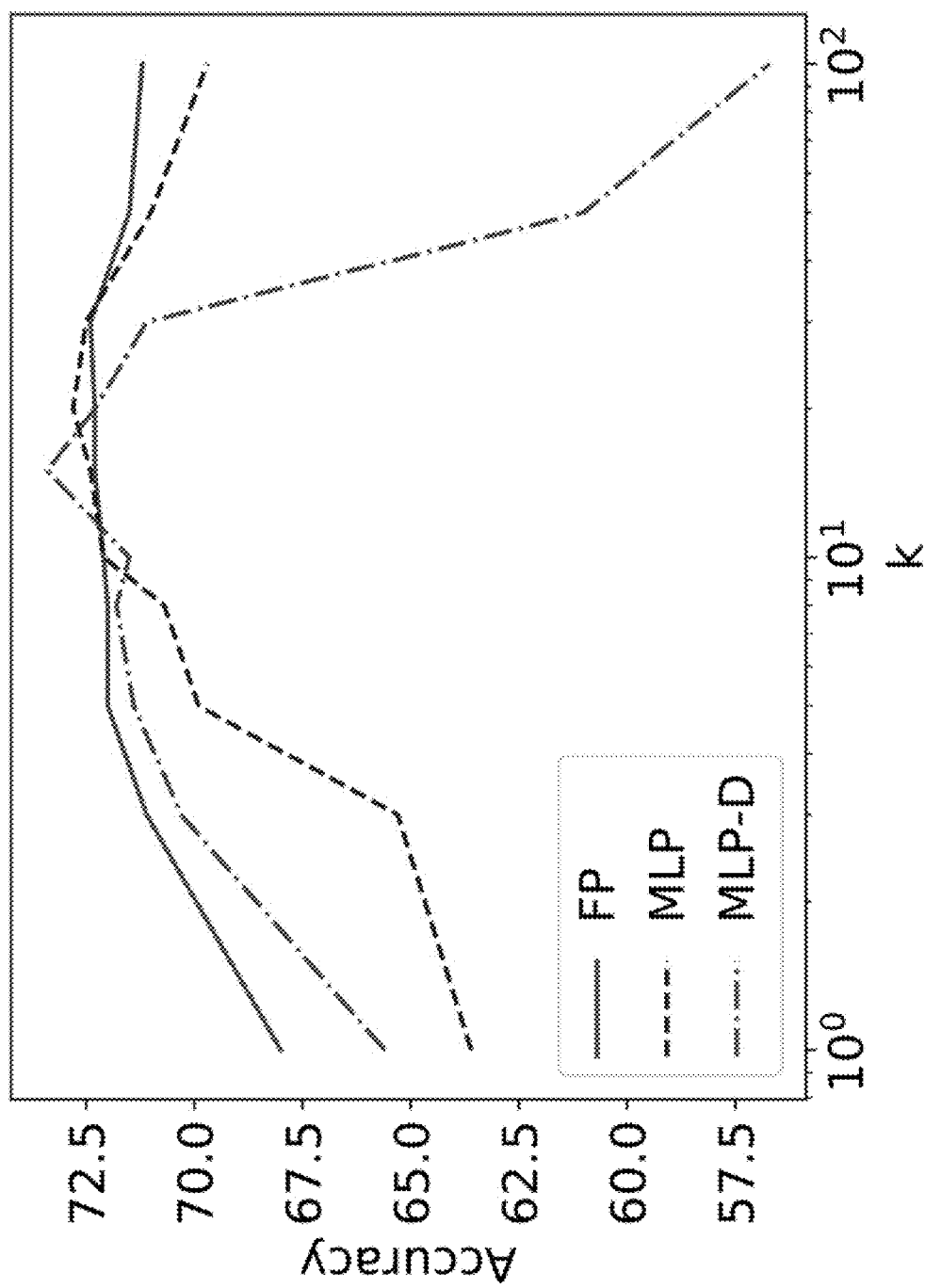

FIG. 7C shows the performance of SLAPS on Cora for as a function of k in kNN, for three graph generators: FP, MLP and MLP-D. For all three cases, the value of k plays a role in model performance. The FP generator is the least sensitive because, in FP, k only affects the initialization of the adjacency matrix but then the model can change the number of neighbors of each node. For MLP and MLP-D, however, the number of neighbors of each node remains close to k (but not necessarily equal as the adjacency processor can add or remove some edges) and the two generators become more sensitive to k. For larger values of k, the extra flexibility of the MLP generator enables removal of some of the unwanted edges through the function P or reducing the weights of the unwanted edges resulting in MLP being less sensitive to large values of k compared to MLP-D.

The output $\tilde{A}$ of generator 142 may have both positive and negative values, may be non-symmetric, and unnormalized. To ensure all values of the adjacency are positive and make the adjacency symmetric and normalized, the following function may be applied by the adjacency processor (or a normalizer) 144 to $\tilde{A}$:

$$A = \frac{1}{2} D^{-\frac{1}{2}} \left( P(\tilde{A}) + P(\tilde{A})^T \right) D^{-\frac{1}{2}} \quad (2)$$

In equation (2), P is a function with a non-negative range applied element-wise on its input. In experimental work, it has been found that applying element-wise ELU to the elements of $\tilde{A}$ and then adding a value of 1 works effectively. The sub-expression $\frac{1}{2}(P(\tilde{A})+P(\tilde{A})^T)$ makes the resulting matrix $P(\tilde{A})$ symmetric.

To understand the reason for taking the mean of $P(\tilde{A})$ and $P(\tilde{A})^T$, assume $\tilde{A}$ is generated by $G_{MLP}$. If $\mathcal{V}_j$ is among the top k similar nodes to $\mathcal{V}_i$ and vice versa, then the strength of the connection between $\mathcal{V}_i$ and $\mathcal{V}_j$ will remain the same. However, if, for example, $\mathcal{V}_j$ is among the top k similar nodes to $\mathcal{V}_i$ but $\mathcal{V}_i$ is not among the top k similar nodes to $\mathcal{V}_j$, then taking the average of the similarities reduces the strength of the connection between $\mathcal{V}_i$ and $\mathcal{V}_j$. Finally, once a symmetric adjacency with non-negative values is obtained, $\frac{1}{2}(P(\tilde{A})+P(\tilde{A})^T)$ can be normalized by computing its degree matrix D and multiplying it from left and right to $$D^{-\frac{1}{2}}.$$

As mentioned, a function P can be used in the adjacency processor 144 to make the values of the $\tilde{A}$ positive. In some experiments, when using an MLP generator, P can be set to the ReLU function applied element-wise on the elements of $\tilde{A}$. When using the fully-parameterized (FP) generator, applying ReLU results in a gradient flow problem as any edge whose corresponding value in $\tilde{A}$ becomes less than or equal to zero stops receiving gradient updates. For this reason, for FP the ELU [19] function is applied to the elements of $\tilde{A}$ and a value of 1 can be added.

Conveniently, making an adjacency matrix symmetric and normalizing it, may empirically lead to better results.

Figure 7D:
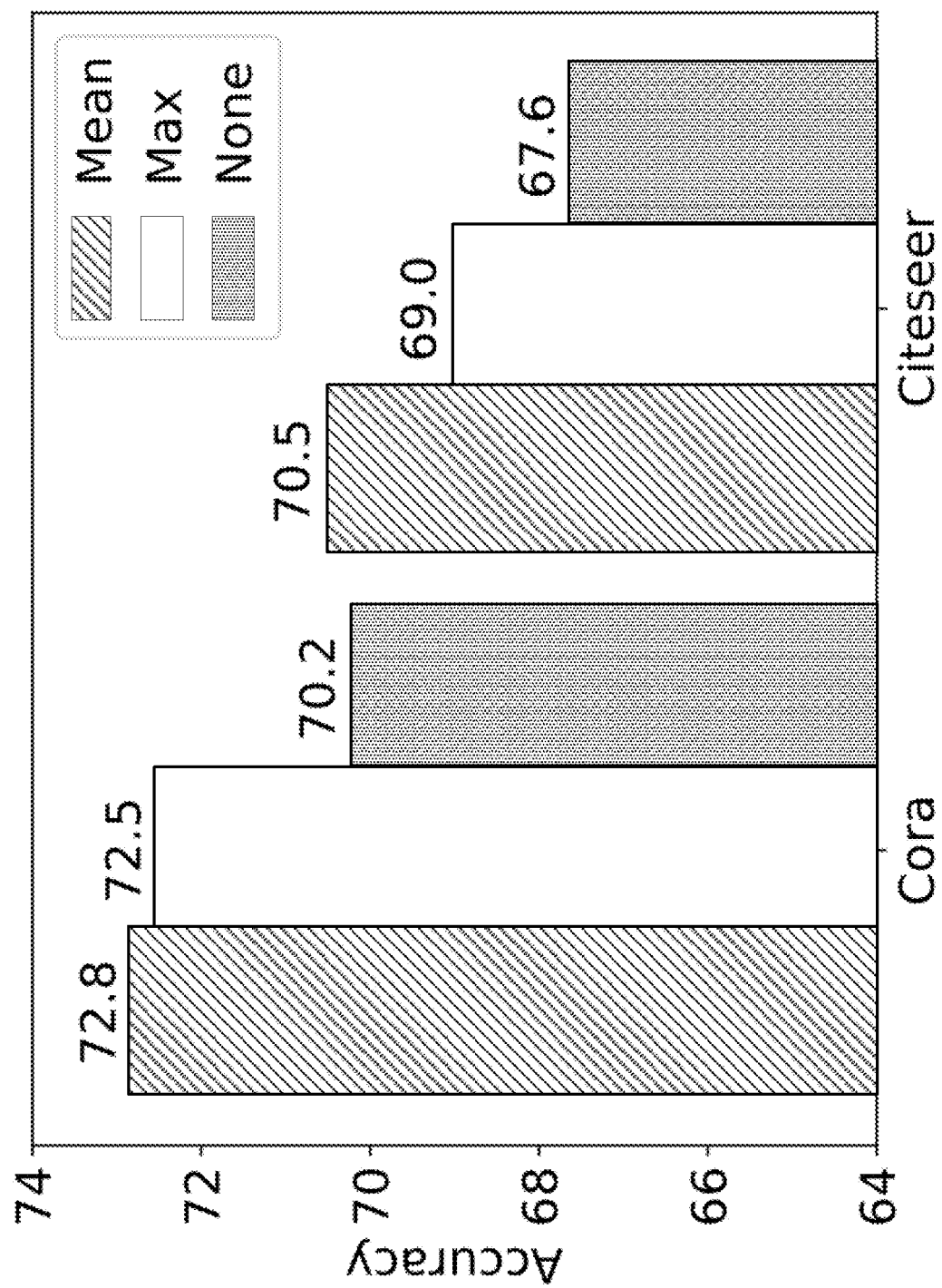

As an alternative to equation (2) above, for the adjacency processor 144, two other choices can be considered: 1) $\max(P(\tilde{A}), P(\tilde{A})^T)$, and 2) not symmetrizing the adjacency (i.e., using $P(\tilde{A})$). FIG. 7D compares these three choices on Cora and Citeseer with an MLP generator (other generators produced similar results). On both datasets, symmetrizing the adjacency provides a performance boost. Compared to mean symmetrization, max symmetrization performs slightly worse. This may be because max symmetrization does not distinguish between the case where both $\mathcal{V}_i$ and $\mathcal{V}_j$ are among the k most similar nodes of each other and the case where only one of them is among the k most similar nodes of the other.

In some embodiments, classifier 146 can be implemented using a function $\text{GNN}_C: \mathbb{R}^{n \times f} \times \mathbb{R}^{n \times n} \to \mathbb{R}$ with parameters $\theta_{GNN_C}$. $\text{GNN}_C$ 146 takes the node features 120 as represented by X and the normalized adjacency matrix A as input, and provides, for each node, the logits for each class 147. $\mathcal{C}$ corresponds to the classes 147 and $|\mathcal{C}|$ corresponds to the number of classes. A two-layer Graph Convolutional Network (GCN) may be used, for which $\theta_{GNN_C}=\{W^{(1)}, W^{(2)}\}$ and $\text{GNN}_C$ 146 can be defined as $\text{GNN}_C(A, X; \theta_{GNN_C})=$ $A\text{ReLU}(AXW^{(1)})W^{(2)}$. Other GNN variants can be used as well (recall that A is normalized). The training loss $\mathcal{L}_C$ for the classification task can be computed by taking the softmax of the logits to produce a probability distribution for each node and then computing the cross-entropy loss.

Classifier 146 thus takes as input node features 120 and the adjacency matrix A normalized by adjacency processor 144 and computes one or more predictions regarding which class 147 each node belongs to.

In many domains, the number of labeled nodes may not be enough for learning both the structure and parameters from data. Furthermore, depending on the initialization of the structure and the method used, many elements of the learned adjacency matrix may receive no (or very little) supervision.

A GNN model may be implemented using only a generator 142, an adjacency processor 144, and a classifier neural network 146. However, this model may suffer severely from supervision starvation. The same problem also applies to many existing approaches for latent graph learning, as they can be formulated as a combination of variants of these three components. For instance, In Learning Discrete Structures (LDS), the adjacency matrix is modelled as a matrix $A \in \mathbb{R}^{n \times n}$ with learnable parameters where $A_{ij}$ is the parameter of a Bernoulli distribution for each i and j. The parameters are initialized based on a kNN graph and then further optimized during training of a two-layer GCN.

Figure 2:
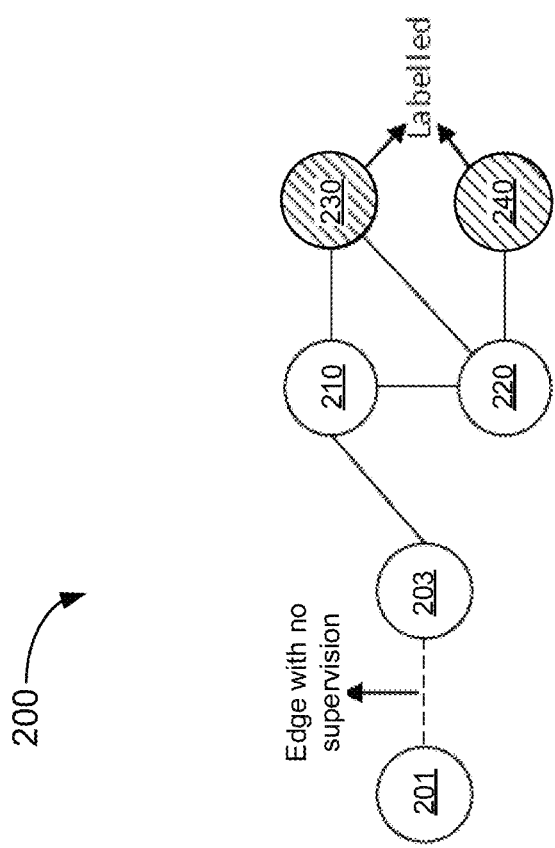
FIG. 2 illustrates an example of supervision received by a graph of nodes and edges, according to an embodiment.

Consider a scenario during training where two unlabeled nodes $\mathcal{V}_i$ and $\mathcal{V}_j$ are not directly connected to any labeled nodes according to the generated graph structure. Then, since a two-layer GCN (e.g. a classifier or GNN) makes predictions for the nodes based on their two-hop neighbors, the classification loss (i.e. $\mathcal{L}_C$) is not affected by the edge between $\mathcal{V}_i$ and $\mathcal{V}_j$ and this edge receives no supervision. FIG. 2 provides an example of such a scenario.

In FIG. 2, a graph 200 is shown. Nodes 201, 203, 210 and 220 represent unlabelled nodes, the shaded nodes 230, 240 represent labelled nodes. The dotted edge represents an edge that receives no supervision as it is not in the two-hop neighborhood of any labelled node. Using a two-layer GCN, the predictions made for the labeled nodes 201, 203, 210 and 220 are not affected by the dashed (starved) edge.

The edges that do not affect the loss function $\mathcal{L}_C$ (and consequently do not receive supervision) can be referred to as starved edges. These edges can be problematic because although they may not affect the training loss, the predictions at the test time depend on these edges, and if their values are learned without enough supervision, the model may make poor predictions at the test time. A natural question concerning the extent of the problem caused by such edges is the proportion of starved edges. The following theorem formally establishes the extent of the problem for Erdös-Rényi graphs [8]. An Erdös-Rényi graph with n nodes and m edges is a graph chosen uniformly at random from the collection of all graphs which have n nodes and m edges.

Theorem 1 Let $\mathcal{G}(n, m)$ be an Erdös-Rényi graph with n nodes and m edges. Assume q nodes selected uniformly at random are labelled. The probability of an edge being a starved edge with a two-layer GCN is equal to $$\left(1 - \frac{q}{n}\right)\left(1 - \frac{q}{n-1}\right)\prod_{i=1}^{2q}\left(1 - \frac{m-1}{\binom{n}{2} - i}\right).$$

To put the numbers from the theorem in perspective, consider three established benchmarks for semi-supervised node classification namely Cora, Citeseer, and Pubmed, the statistics which can be found in table 300 in FIG. 3. For an Erdös-Rényi graph with similar statistics as the Cora dataset (n=2708, m=5429, q=140), the probability of an edge being a starved edge is 59.4% according to the above theorem. For Citeseer and Pubmed, this number is 75.7% and 96.7% respectively. While Theorem 1 is stated for Erdös-Rényi graphs, the identified problem also applies to natural graphs. For the original structures of Cora, Citeseer, and Pubmed, for example, 48.8%, 65.2%, and 91.6% of the edges are starved edges.

In some embodiments, a solution to the supervision starvation problem is to define a prior graph structure and regularize the learned structure toward it. This leads the starved edges toward the prior structure as opposed to neglecting them. The choice of the prior can determine the inductive bias incorporated into the model. A prior structure can be defined based on the following hypothesis:

Hypothesis 1 A graph structure that is suitable for predicting the node features is also suitable for predicting the node labels.

Consider an extreme scenario where one of the node features is the same as the node labels. A graph structure that is suitable for predicting this feature exhibits homophily for it. Because of the equivalence between this feature and the labels, the graph structure also exhibits homophily for the labels, so it is also suitable for predicting the labels. In the general (non-extreme) case, there may not be a single feature that is equivalent to the labels but a subset of the features may be highly predictive of the labels. A graph structure that is suitable for predicting this subset exhibits homophiliy for the features in the subset. Because this subset is highly predictive of the labels, the structure also exhibits a high degree of homophiliy for the labels, so it is also suitable for predicting the node labels.

As explained above, some edges may receive minimal or no supervision during latent graph learning. While increasing the number of layers of the GCN may alleviate the problem to some extent, deeper GCNs typically provide inferior results due to issues such as oversmoothing [see, e.g., 26, 31]. Deeper GCNs are empirically tested for latent graph learning to see if simply using more layers can obviate the need for the proposed self-supervision. Specifically, SLAPS are tested without self-supervision (i.e. $\lambda$=0) with 2, 4, and 6 layers on Cora dataset. Residual connections that have been shown to help train deeper GCNs are also added [59]. The accuracies for 2, 4, and 6-layer models are 66.2%, 67.1%, and 55.8% respectively. It can be viewed that increasing the number of layers from 2 to 4 provides an improvement. This might be because the benefit provided by a 4-layer model in terms of alleviating the starved edge problem outweighs the increase in oversmoothing. However, when the number of layers increases to 6, the oversmoothing problem outweighs and the performance drops significantly. Further increasing the number of layers resulted in even lower accuracies. In some embodiments, the classifier 136 may therefore include a four-layer GCN.

In the disclosed embodiments below, a learning-based approach based on self-supervision is described. The learned graph structure (adjacency matrix) can be used for the classification task, but also for denoising the node features 120. The self-supervised task encourages the model to learn a structure that is suitable for predicting the node features.

To increase the amount of supervision for learning the structure and make sure every possible edge receives supervision, a self-supervised approach may be employed based on denoising auto-encoders [41]. In some embodiments, a denoising auto-encoder 148 can be implemented using a GNN, e.g., a $GNN_{DAE}$: $\mathbb{R}^{n \times f} \times \mathbb{R}^{n \times n} \rightarrow \mathbb{R}^{n \times f}$ with parameters $\theta_{GNN_{DAE}}$. $GNN_{DAE}$ 148 can take some noisy node features 145 and a normalized adjacency matrix A produced by generator 142 and normalized by normalizer 144 as input, and generates updated, denoised node features 149 with same dimension as output. The noisy node features 145 may be generated by adding noise 143 to the original node features 120.

Denoising auto-encoder ($GNN_{DAE}$) 148 can be trained such that it receives a noisy version $\tilde{X}$ 145 of the node features X 120 as input and produces the denoised features $\bar{X}$ 149 as output. Let idx represent the indices corresponding to the elements of X to which noise has been added, and $X_{idx}$ represent the values at these indices. In some embodiments, the aim of the training is to minimize the following function:

$$\mathcal{L}_{DAE} = L(X_{idx}, GNN_{DAE}(\tilde{X}, A; \theta_{GNN_{DAE}})_{idx}) \quad (3)$$

where A is the generated (normalized) adjacency matrix and L is a loss function. The subindex in $A_{\theta_G}$ indicates that the adjacency matrix A is a function of the generator parameters $\theta_G$. To add noise to the input features for datasets where the node features X 120 consist of binary vectors, in each iteration, idx consist of r percent of the indices of X whose values are ones and $r\eta$ percent of the indices whose values are zeros, both selected uniformly at random. Both r and $\eta$ (corresponding to the negative ratio) are hyperparameters.

In some embodiments, noise 143 can be added by setting the 1s in the selected mask to 0s, and L is the binary cross-entropy loss. For datasets where the input features are continuous numbers, idx consists of r percent of the indices of X selected uniformly at random in each epoch, noise 143 can be added by either replacing the values at idx with 0 or by adding independent Gaussian noises to each of the node features 120. In this case, L is the mean-squared error loss.

Note that the self-supervised task in equation (3) is generic and can be added to different GNNs as well as latent graph learning models. It can be also combined with other techniques in the literature that encourage learning more homophilous structures or increase the amount of supervision. In experiments (further elaborated in detail later in this disclosure), the combination of the disclosed self-supervised model in the embodiments with two such techniques namely self-training [26] and AdaEdge [3] are tested. Self-training helps the model see more labeled nodes and AdaEdge helps iteratively create graph structure with higher degrees of homophily.

In some embodiments, structure learning model 140 is trained to minimize $\mathcal{L} = \mathcal{L}_C + \lambda \mathcal{L}_{DAE}$ where $\mathcal{L}_C$ is the classification loss, $\mathcal{L}_{DAE}$ is the denoising autoencoder loss (see Equation (3)), and $\lambda$ is a hyperparameter controlling the relative importance of the two losses.

Structure learning model 140 can be implemented in two types of embodiments: a $SLAPS_{2s}$ model with two separate training stages, and a $SLAPS_{e2e}$ model with end to end, concurrent training of both classifier 146 and denoising autoencoder 148. Each of these models can be further divided into categories based on generator 142 and adjencency processor 144 that is used.

In $SLAPS_{2s}$, which is trained in two stages, first the denoising autoencoder 148 implemented using a $GNN_{DAE}$ model can be trained by minimizing $\mathcal{L}_{DAE}$ described in in Equation (3). Recall that $\mathcal{L}_{DAE}$ depends on the parameters $\theta_G$ of the generator 142 and the parameters $\theta_{GNN_{DAE}}$ of the denoising autoencoder 148. After every t epochs of training, the adjacency matrix A can be updated and fixed, and a classifier 146 can be trained with the fixed adjacency matrix, and a classification accuracy may be measured on a validation set. The epoch that produces the adjacency matrix A providing the best validation accuracy for the classifier 146 may be selected. Note that in $SLAPS_{2s}$, the adjacency matrix A only receives gradients from the self-supervised task in equation (3). Note that in this approach, the adjacency matrix is only updated based on the $GNN_{DAE}$ 148, and the actual labels are only used for early stopping. The parameters of generator 142 are thus trained to generate an adjacency matrix A that is a good adjacency for $GNN_{DAE}$ 148. Conveniently, $SLAPS_{2s}$ may be suitable for scenarios with very few labels for classifier 146 to reduce the risk of overfitting.

For $SLAPS_{e2e}$, the adjacency matrix A can be updated based on both denoising auto-encoder 148 and classifier 146. In this case, the loss function can be defined as $\mathcal{L} = \mathcal{L}_C + \lambda \mathcal{L}_{dae}$ where $\mathcal{L}_C$ represents the classification loss and $\lambda$ is a hyperparameter controlling the relative importance of the two losses. The parameters of generator 142 are thus trained to generate adjacency that is a good adjacency for both of generator 142 and classifier 146.

In some embodiments, the strucut learning model 140 can be implemented in PyTorch [13], and deep graph library (DGL) [16] can be used for the sparse operations, and Adam [8] can be used as the optimizer. Early stopping and hyperparameter tuning are performed based on the accuracy on the validation set for some datasets except Wine and Cancer. Validation cross-entropy loss for these two datasets.

In some embodiments, a maximum number of epochs is set to 2000. Two-layer GCNs for both $GNN_C$ and $GNN_{DAE}$ are used as well as for baselines and two-layer MLPs. Two learning rates are used, one for GCNC as $lr_C$ and one for the other parameters of the models as $lr_{DAE}$. The two learning rates are tuned from the set $\{0.01, 0.001\}$. Dropout layers are added with dropout probabilities of 0.5 after the first layer of the GNNs. Dropout are also added to the adjacency matrix for both $GNN_C$ and $GNN_{DAE}$ as $dropout_C$, $dropout_{DAE}$ respectively and tuned the values from the set 0.25, 0.5. The hidden dimension of $GNN_C$ are set to 32 for all datasets except for ogbn-arxiv for which it is set to 256.

Cosine similarity is used for building the kNN graphs and tuned the value of k from the set $\{10,15,20,30\}$. $\lambda$, which controls the relative importance of the two losses $\mathcal{L}$ DAE and $\mathcal{L}_C$, is tuned from the set $\{0.1, 1, 10, 100, 500\}$. r and $\eta$ are tuned from the sets $\{1,5,10\}$ and $\{1,5\}$ respectively. The best set of hyperparameters for each dataset chosen on the validation set is in FIG. 4E.

For GRCN [18], DGCNN [17], and IDGL [2], the hyperparameters are tuned as suggested in the original papers. For LP [20], scikit-learn python package [14] is used. All the results for the embodiments for structure learning model 140 and the baselines are averaged over 10 runs. All the experiments on run on a single GPU (NVIDIA GeForce GTX 1080 Ti).

In some embodiments, SLAPS (and kNN-GCN) implementations are combined with two techniques from the literature namely self-training and AdaEdge. For completeness sake, a brief description of these approaches are provided.

For self-training, a model 140 is trained using the existing labels in the training set. Then this model 140 is used to make predictions for the unlabeled nodes that were not in the train, validation, or test sets. The label predictions for the top $\zeta$ most confident unlabeled nodes are considered as ground truth labels and added to the training labels. Finally, a model is trained from scratch on the expanded set of labels. Here, $\zeta$ is a hyperparameter with its value tuned from the set $\{50,100,200,300,400,500\}$.

For AdaEdge, in the case of kNN-GCN, a kNN-GCN model is first trained. Then the structure of the graph is modified from the kNN graph to a new graph by following these steps: 1) adding edges between nodes with the same class predictions if both prediction confidences surpass a threshold, 2) removing edge between nodes with different class predictions if both prediction confidences surpass a threshold. Then, a GCN model is trained on the new structure and repeated the aforementioned steps to generate a new structure. This is performed iteratively until generating a new structure did not provide a boost in performance on the validation set. For SLAPS, a similar approach is followed, except that the initial model was a SLAPS model instead of a kNN-GCN model.

In experiments, embodiments of structure learning model 140 are compared to several baselines with different properties. A category of the baselines consist of models that do not take the graph structure into account; these models include logistic regression (LR) and multi-layer perceptron (MLP). Similar to [10], a baseline named kNN-GCN is considered, where a kNN graph is created and fed it into a GCN model. The graph structure remains fixed in this model. Baselines include LDS [10] and Graph-Revised Convolutional Network (GRCN) [47] where a kNN graph is fed to the GRCN model as the initial adjacency matrix to be revised.

For experiments, two established benchmark datasets in the GNN literature have been used, namely Cora and Citeseer, as well as Wine, Cancer, Digits and 20news. The dataset statistics are illustrated in table 300 in FIG. 3. The LDS model changes the train and validation splits by using half of the validation set during training of their bi-level optimization setup and the other half for early stopping and selecting the best hyperparameters. This is a substantial change as it increases the number of labels used during training from 140 to 390 for Cora and from 120 to 370 for Citeseer. To provide a fair comparison to LDS, results of structure learning model 140 (SLAPS$_{2s}$ and SLAPS$_{e2e}$) are also reported on the Cora and Citeseer datasets with modified train and validation sets. The modified versions are named Cora390 and Citeseer370 respectively. Results are provided in FIGS. 4A and 4B († indicates results have been taken from [10]).

Embodiments of structure learning as disclosed herein can be useful in domains for which graph structure may be unknown, such as stock prediction in which companies may be connected or correlated, but in an unknown manner. If graph structure can be learned, it may be possible to learn how companies are connected. A graph neural network applied to such a graph structure may provide better results than considering each company in isolation.

Similarly, structure learning techniques disclosed herein can be applied to the domain of housing prices to predict prices of different houses. It may be hypothesized that nearby houses have similar properties and prices, but without a graph structure, it may not be known or fully known how the houses relate or are connected to each other. Learning a structure of a graph connecting such houses may lead to better results.

Figure 5:
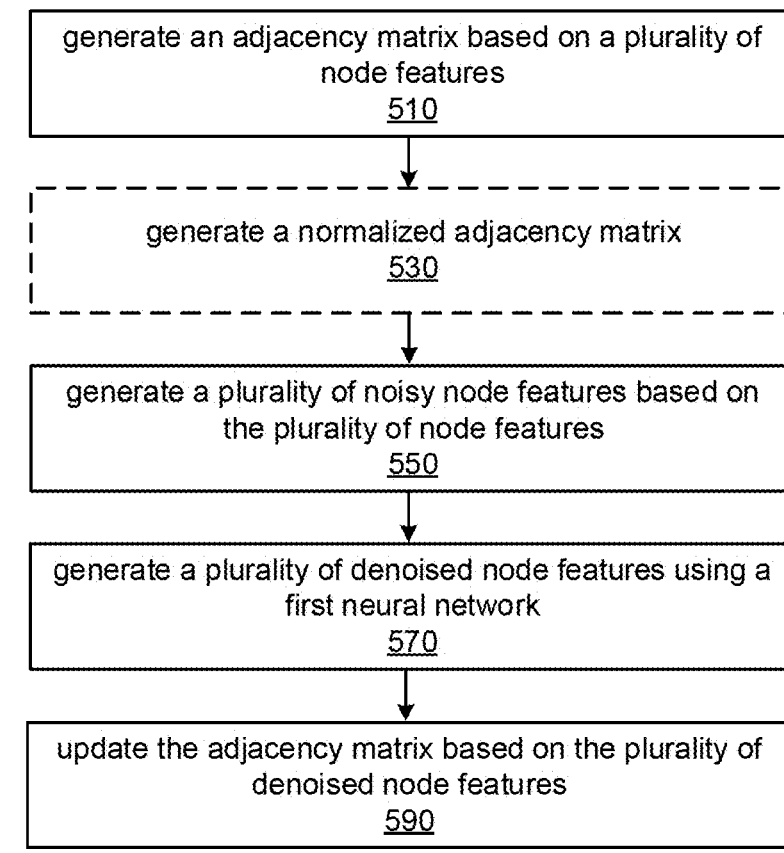
FIG. 5 is a flowchart of a method for graph structure learning, according to an embodiment.

FIG. 5 illustrates a flow chart of a method 500 for structure learning, which may be performed by one or more components of system 100, according to an embodiment. The steps are provided for illustrative purposes. Variations of the steps, omission or substitution of various steps, or additional steps may be considered.

At block 510, the processor can, via a generator 142, generate an adjacency matrix (Ã) based on a plurality of node features 120. The plurality of node features 120 may include, for each node, one or more data elements representing some features associated with the respective node. The one or more data elements may be part of a feature vector for the node.

In some embodiments, generating the adjacency matrix (Ã) is based on full parameterization.

In some embodiments, generating the adjacency matrix is based on a multi-layer perceptron (MLP) with k nearest neighbors.

In some embodiments, generating the adjacency matrix (Ã) can be performed by a generator function $G: \mathbb{R}^{n \times f} \to \mathbb{R}^{n \times n}$ with parameters $\theta_G$, wherein the generator function G is configured to receive the plurality of node features $X \in \mathbb{R}^{n \times f}$ as input and to output the adjacency matrix $\tilde{A} \in \mathbb{R}^{n \times n}$, and the parameters $\theta_G$ corresponds to weights of the MLP: $\mathbb{R}^{n \times f} \to \mathbb{R}^{n \times fi}$.

In some embodiments, at block 530, a normalized adjacency matrix can be normalized by an adjacency processor 144, which can be a normalizer 144, to generate a normalized adjacency matrix (A).

At block 550, the processor can generate a plurality of noisy node features 145 based on the plurality of node features 120. For example noise 143 may be added to the plurality of node features 120 to generate the noisy node features 145.

In some embodiments, noise 143 can be added by setting the 1s in the selected mask to 0s. For datasets where the input features are continuous numbers, idx consists of r percent of the indices of X selected uniformly at random in each epoch, noise 143 can be added by either replacing the values at idx with 0 or by adding independent Gaussian noises to each of the node features 120.

At block 570, the processor can generate a plurality of denoised node features using a first neural network 148. For example, a first neural network 148 is trained, in some embodiments, to receive the noisy node features 145 and the an adjacency matrix (A) and generate denoised node features 149.

In some embodiments, the first neural network 148 is implemented using a graph neural network (GNN).

In some embodiments, the first neural network 148 is implemented using a denoising autoencoder (DAE).

At block 590, the processor can update the adjacency matrix (A) based on the plurality of denoised node features 149. In some embodiments, training the first neural network (e.g., a denoising auto-encoder) 148 comprises training the second neural network (e.g., a classifier) 146, and updating the normalized adjacency matrix (A) is based further on training the second neural network (e.g., a classifier) 146.

In some embodiments, the first neural network GNN$_{DAE}$ has a loss function $\mathcal{L}_{DAE}$ determined based on the plurality of noisy node features and parameters of the first neural network GNN$_{DAE}$.

In some embodiments, the loss function $\mathcal{L}_{DAE}$ is represented by the function $$\mathcal{L}_{DAE} = L(X_{idx}, \text{GNN}_{DAE}(\tilde{X}, A; \theta_{\text{GNN}_{DAE}})_{idx}),$$

where A represents the generated adjacency matrix, $\theta_{\text{GNN}_{DAE}}$ represents parameters of the first neural network GNN$_{DAE}$, X represents the plurality of node features, $\tilde{X}$ represents the plurality of noisy node features, idx represent indices corresponding to the elements of X to which noise has been added, and $X_{idx}$ represent corresponding values of elements at idx.

In some embodiments, the method may include updating one or more parameters of the first neural network $GNN_{DAE}$ by minimizing the loss function $\mathcal{L}_{DAE}$.

In some embodiments, the loss function $\mathcal{L}_{DAE}$ may be determined based on a binary cross-entropy loss or a mean-squared error loss.

In some embodiments, the process 500 further includes using a second neural network, such as a classifier 146, to generate predictions including one or more classes 147 for each node based on the plurality of node features 120 and the adjacency matrix.

In some embodiments, the adjacency matrix is a normalized adjacency matrix A.

In some embodiments, the second neural network 146 is a graph neural network.

In some embodiments, the second neural network 146 is a two-layer graph convolutional network.

In some embodiments, the method may include updating one or more parameters of the first and second neural networks by minimizing a combined loss determined based on $\mathcal{L}_C$ and $\mathcal{L}_{DAE}$, wherein $\mathcal{L}_C$ represents a loss function of the second neural network.

In some embodiments, the combined loss is determined based on a combined loss function $\mathcal{L} = \mathcal{L}_C + \lambda \mathcal{L}_{DAE}$, wherein $\mathcal{L}_C$ represents a loss function of the first neural network, and $\lambda$ is a hyperparameter controlling a relative importance between $\mathcal{L}_C$ and $\mathcal{L}_{DAE}$.

One or more blocks of 510 to 590 may be iteratively performed to fine tune the weights of the first and/or second neural network(s) during the training process, until a predefined threshold has been reached. Such a predefined threshold may be, for example, a maximum number of epochs or training cycles. Another example may be a minimum value of a loss function determined based on the respective loss function of the first or second neural network.

For example, the first neural network may be trained by: generating an adjacency matrix based on a plurality of node features; generating a plurality of noisy node features based on the plurality of node features; generating a plurality of denoised node features using the neural network based on the plurality of noisy node features and the adjacency matrix; and updating the adjacency matrix based on the plurality of denoised node features.

It should be understood that one or more of the blocks may be performed in a different sequence or in an interleaved or iterative manner.

Figure 6:
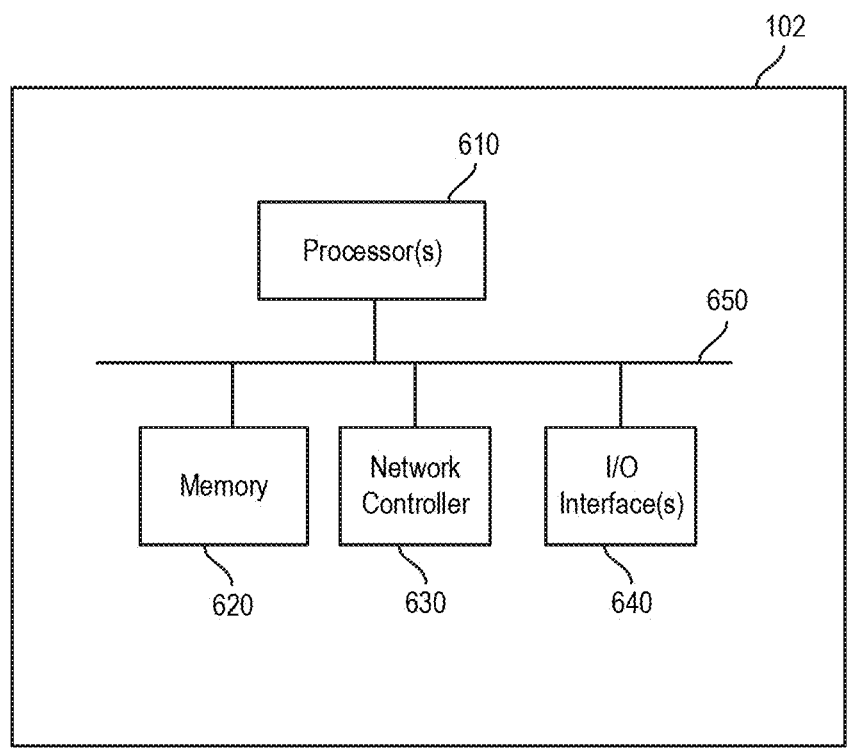
FIG. 6 is a block diagram of example hardware components of a computing device for structure learning, according to an embodiment.

System 100 may be implemented as software and/or hardware, for example, in a computing device 102 as illustrated in FIG. 6. Process 500, in particular, one or more of blocks 510 to 590, may be performed by software and/or hardware of a computing device such as computing device 102.

As illustrated, computing device 102 includes one or more processor(s) 610, memory 620, a network controller 630, and one or more I/O interfaces 640 in communication over bus 650.

Processor(s) 610 may be one or more Intel x86, Intel x64, AMD x86-64, PowerPC, ARM processors or the like.

Memory 620 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 630 serves as a communication device to interconnect the computing device with one or more computer networks such as, for example, a local area network (LAN) or the Internet.

One or more I/O interfaces 640 may serve to interconnect the computing device with peripheral devices, such as for example, keyboards, mice, video displays, and the like. Such peripheral devices may include a display of device 102. Optionally, network controller 630 may be accessed via the one or more I/O interfaces.

Software instructions are executed by processor(s) 610 from a computer-readable medium. For example, software may be loaded into random-access memory from persistent storage of memory 620 or from one or more devices via I/O interfaces 640 for execution by one or more processors 610. As another example, software may be loaded and executed by one or more processors 610 directly from read-only memory.

Example software components and data stored within memory 620 of computing device 102 may include software to learn graph structure, as described herein, and operating system (OS) software allowing for basic communication and application operations related to computing device 102.

Memory 620 may include machine learning code with rules and models such as structure learning model 140. The machine learning code can be refined based on learning.

Related Work

Existing systems and methods that relate to this work can be grouped into the four categories: similarity graph, fully connected graph, latent graph learning and leveraging domain knowledge. [55] may provide a full survey.

Similarity graph: one approach for inferring a graph structure is to select a similarity metric and set the edge weight between two nodes to be their similarity [34, 39, 1]. To obtain a sparse structure, one may create a kNN similarity graph, only connect pairs of nodes whose similarity surpasses some predefined threshold, or do sampling. As an example, in [12] a (fixed) kNN graph using the cosine similarity of the node features is created. In [42], this idea is extended by creating a fresh graph in each layer of the GNN based on the node embedding similarities in that layer. Instead of choosing a single similarity metric, in [13] several (potentially weak) measures of similarity are fused. The quality of the predictions of these methods depends heavily on the choice of the similarity metric(s).

Fully connected graph: another approach is to start with a fully connected graph and assign edge weights using the available meta-data or employ the GNN variants that provide weights for each edge via an attention mechanism [40, 48]. This approach has been used in computer vision [e.g., 59, 38], natural language processing [e.g., 51], and few-shot learning [e.g., 11]. The complexity of this approach grows rapidly making it applicable only to small-sized graphs. [49] proposes to define local neighborhoods for each node and only assume that these local neighborhoods are fully connected. Their approach relies on an initial graph structure to define the local neighborhoods.

Latent graph learning: Instead of a similarity graph based on the initial features, one may use a graph generator with learnable GNN parameters. In [27], a fully connected graph is created based on a bilinear similarity function with learnable parameters. In [10], a Bernoulli distribution is learned for each possible edge and graph structures are created through sampling from these distributions. In [44], the input structure is updated to increase homophily based on the labels and model predictions. In [4], an iterative approach is proposed that iterates over projecting the nodes to a latent space and constructing an adjacency matrix from the latent representations multiple times. A common approach in this category is to learn a projection of the nodes to a latent space where node similarities correspond to edge weights or edge probabilities. In [43], the nodes are projected to a latent space by learning weights for each of the input features. In [33, 19, 6], a multi-layer perceptron is used for projection. In [47, 50], a GNN is used for projection; it uses the node features and an initial graph structure. Some pre-training strategies for learning GNN parameters may be found in [15, 16, 20, 46, 53].

Leveraging domain knowledge: in some applications, one may leverage domain knowledge to guide the model toward learning specific structures. For example, in [22], abstract syntax trees and regular languages are leveraged in learning graph structures of Python programs that aid reasoning for downstream tasks. In [21], the structure learning is guided for robustness to adversarial attacks through the domain knowledge that clean adjacency matrices are often sparse and low-rank and exhibit feature smoothness along connected nodes. Other examples in this category include [17, 33].

Proof of Theorem 1

Theorem 1 Let $\mathcal{G}(n, m)$ be an Erdös-Rényi graph with n nodes and m edges. Assume q nodes selected uniformly at random are labelled. The probability of an edge being a starved edge with a two-layer GCN is equal to $$\left(1 - \frac{q}{n}\right)\left(1 - \frac{q}{n-1}\right)\prod_{i=1}^{2q}\left(1 - \frac{m-1}{\binom{n}{2} - i}\right).$$

Proof 1 To compute the probability of an edge being a starved edge, the probability of the two nodes of the edge being unlabeled themselves is first computed, and then the probability of the two nodes not being connected to any labeled nodes is computed. Let v and u represent two nodes connected by an edge.

With n nodes and q labels, the probability of a node being labeled is $$\frac{q}{n}.$$

Therefore,

Probability or $Pr(v \text{ is unlabeled}) =$ $$\left(1 - \frac{q}{n}\right) \text{ and } Pr(u \text{ is unlabled} | v \text{ is unlabled}) = \left(1 - \frac{q}{n-1}\right).$$

Therefore, $$Pr(v \text{ is unlabled and } u \text{ is unlabled}) = \left(1 - \frac{q}{n}\right)\left(1 - \frac{q}{n-1}\right).$$

Since there is an edge between $v$ and $v$, there are m−1 edges remaining. Also, there are $$\binom{n}{2} - 1$$

pairs of nodes that can potentially have an edge between them. Therefore, the probability of $v$ being disconnected from the first labeled node is $$1 - \frac{m-1}{\binom{n}{2} - 1}.$$

If $v$ is disconnected from the first labeled node, there are still m−1 edges remaining and there are now $$\binom{n}{2} - 2$$

pairs of nodes that can potentially have an edge between them. So the probability of $v$ being disconnected from the second node given that it is disconnected from the first labeled node is $$1 - \frac{m-1}{\binom{n}{2} - 2}.$$

With similar reasoning, the probability of $v$ being disconnected from the i-th labeled node given that it is disconnected from the first i−1 labeled nodes is $$1 - \frac{m-1}{\binom{n}{2} - i}.$$

Similarly, the probability of $u$ being disconnected from the first labeled node given that $v$ is disconnected from all q labeled nodes is $$1 - \frac{m-1}{\binom{n}{2} - q - 1}.$$

That is because there are still m−1 edges remaining and $$\binom{n}{2} - q - 1$$

pairs of nodes that can potentially be connected with an edge. The probability of $u$ being disconnected from the i-th labeled node given that it is disconnected from the first i−1 labeled nodes and that $v$ is disconnected from all q labeled nodes is $$1 - \frac{m-1}{\binom{n}{2} - q - i}.$$

As the probability of the two nodes being unlabeled and not being connected to any labeled nodes in the graph are independent, their joint probability is the multiplication of their probabilities computed above and it is equal to $$\left(1 - \frac{q}{n}\right)\left(1 - \frac{q}{n-1}\right) \prod_{i=1}^{2q} \left(1 - \frac{m-1}{\binom{n}{2} - i}\right).$$

Experiments

In this section, experimental results are disclosed.

Baselines: example embodiments of the structure learning model 140 are compared to several baselines with different properties. The first baseline is a multi-layer perceptron (MLP) which does not take the graph structure into account. Example embodiments of the structure learning model 140 are also compared against a second baseline, MLP-GAM* [37] which learns a fully connected graph structure and uses this structure to supplement the loss function of the MLP toward predicting similar labels for neighboring nodes. A third baseline is label propagation (LP) [54], a well-known model for semi-supervised learning. Similar to [10], a baseline named kNN-GCN is also considered, where a kNN graph is generated based on the node feature similarities and fed to a GCN; the graph structure remains fixed in this approach. Example embodiments of the structure learning model 140 are further compared with prominent existing latent graph learning models including LDS [10], GRCN [47], DGCNN [42], and IDGL [4]. A kNN graph is sent as input to the models requiring an initial graph structure. How the addition of self-training and AdaEdge impact the performance of kNN-GCN as well as SLAPS are also explored.

Datasets: three established benchmarks in the GNN literature namely Cora, Citeseer, and Pubmed [36] are used, as well as the ogbn-arxiv dataset [14] that is orders of magnitude larger than the other three datasets and is more challenging due to the more realistic split of the data into train, validation, and test sets. For these datasets, only the node features are fed to the models and not their original graph structure. Following [10, 4], several classification (non-graph) datasets available in scikit-learn [32] are experimented including Wine, Cancer, Digits, and 20News. Furthermore, following [18], results on the MNIST dataset [25] are provided. For Cora and Citeseer, the LDS model uses the train data for learning the parameters of the classification GCN, half of the validation for learning the parameters of the adjacency matrix (in their bi-level optimization setup, these are considered as hyperparameters), and the other half of the validation set for early stopping and tuning the other hyperparameters.

Besides experimenting with the original setups of these two datasets, a modified setup that is closer to that of LDS is experimented: the train set and half of the validation set are used for training and the other half of validation for early stopping and hyperparameter tuning. The modified setups are named Cora390 and Citeseer370 respectively where the number proceeding the dataset name shows the number of labels from which gradients are computed. A similar procedure for the scikit-learn datasets is also performed.

FIG. 4C illustrates results of SLAPS and the baselines on established node classification benchmarks. † indicates results have been taken from [10]. ‡ indicates results have been taken from [37]. Bold and underlined values indicate best and second-best mean performances respectively. OOM indicates out of memory. OOT indicates out of time (24 hour for each run). NA indicates not applicable.

Empirical results and comparison on MNIST: [18] show that learning a graph structure of the input examples can help with semi-supervised classification in computer vision. In particular, they create three versions of the MNIST dataset each consisting of a randomly selected subset with 10,000 examples in total. The first version contains 1000 labels for training, the second contains 2000 labels, and the third version contains 3000 labels for training. All three variants use an extra 1000 labels for validation. The other examples are used as test examples.

Here, an experiment is carried out to measure the performance of SLAPS on these variants of the MNIST dataset. SLAPS is compared against GLCN [18] as well as the baselines in the GLCN paper including manifold regularization [1], label propagation, deep walk [61], graph convolutional networks (GCN), and graph attention networks (GAT).

The results are reported in Table 1. From the results, it can be viewed that SLAPS outperforms GLCN and all the other baselines on the 3 variants. Compared to GLCN, on the three variants SLAPS reduces the error by 7%, 5%, and 2% respectively, showing that SLAPS can be more effective when the labeled set is small and providing more empirical evidence for Theorem 1.

TABLE 1

Results on the MNIST dataset.
Bold values indicate best mean performances.
Underlined values indicate second best mean performance.
All the results for baseline have been taken from [18].

| Model | MNIST (0000) | MNIST (2000) | MNIST (3000) |
|---|---|---|---|
| ManiReg | 92.74 ± 0.33 | 93.96 ± 0.23 | 94.69 ± 0.22 |
| LP | 79.28 ± 0.91 | 81.91 ± 0.82 | 83.45 ± 0.53 |
| DeepWalk | 94.55 ± 0.27 | 95.04 ± 0.28 | 95.34 ± 0.26 |
| GCN | 90.59 ± 0.26 | 90.91 ± 0.19 | 91.01 ± 0.23 |
| GAT | 92.11 ± 0.35 | 92.64 ± 0.28 | 92.81 ± 0.29 |
| GLCN | 94.28 ± 0.28 | 95.09 ± 0.17 | 95.46 ± 0.20 |
| SLAPS | 94.66 ± 0.18 | 95.35 ± 0.11 | 95.54 ± 0.04 |

Earlier, Hypothesis 1 was validated by adding a self-supervised task to encourage learning a graph structure that is appropriate for predicting the node features, and showing in experiments how this additional task helps improve the results. Here, more evidence is provided for the validity of Hypothesis 1 by showing that positive results can be obtained even when regularizing the learned graph structure toward a manually fixed structure that is appropriate for predicting the node features.

Toward this goal, Cora and Citeseer datasets are used to generate a cosine similarity graph as the prior graph $A^{prior}$ where the edge weights correspond to the cosine similarity of the nodes. $A^{prior}$ is sparsified by connecting each node only to the k most similar nodes. Then, a term $\lambda \|A - A^{prior}\|_F$ is added to the loss function where $\lambda$ is a hyperparameter, A is the learned graph structure (i.e. the output of the graph generator), and $\|\cdot\|_F$ shows the Frobenius norm. Note that $A^{prior}$ exhibits homophily with respect to the node features because the node features in Cora and Citeseer are binary, so two nodes that share the same values for more features have a higher similarity and are more likely to be connected.

Figure 7E:
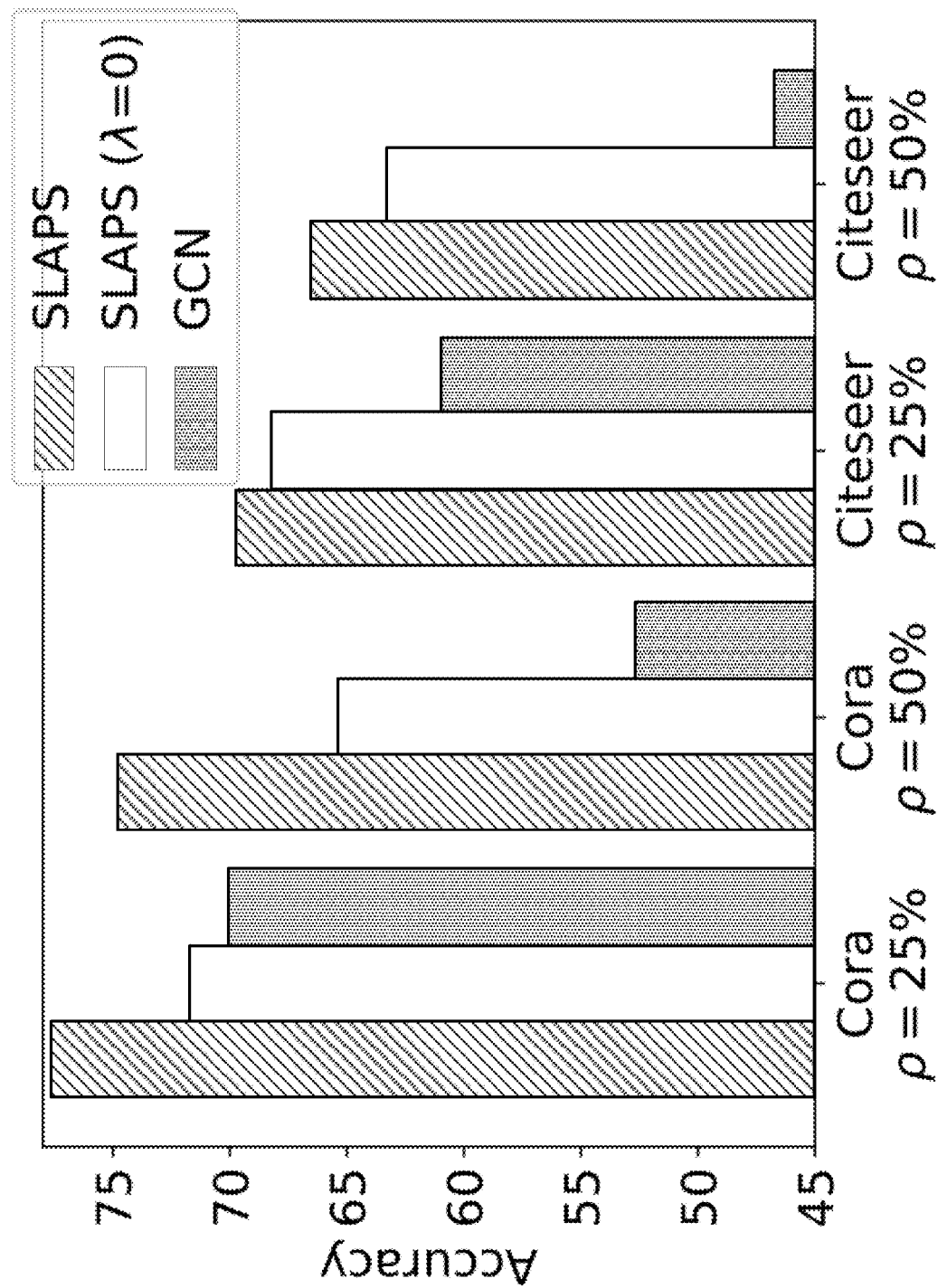
Figure 7F:
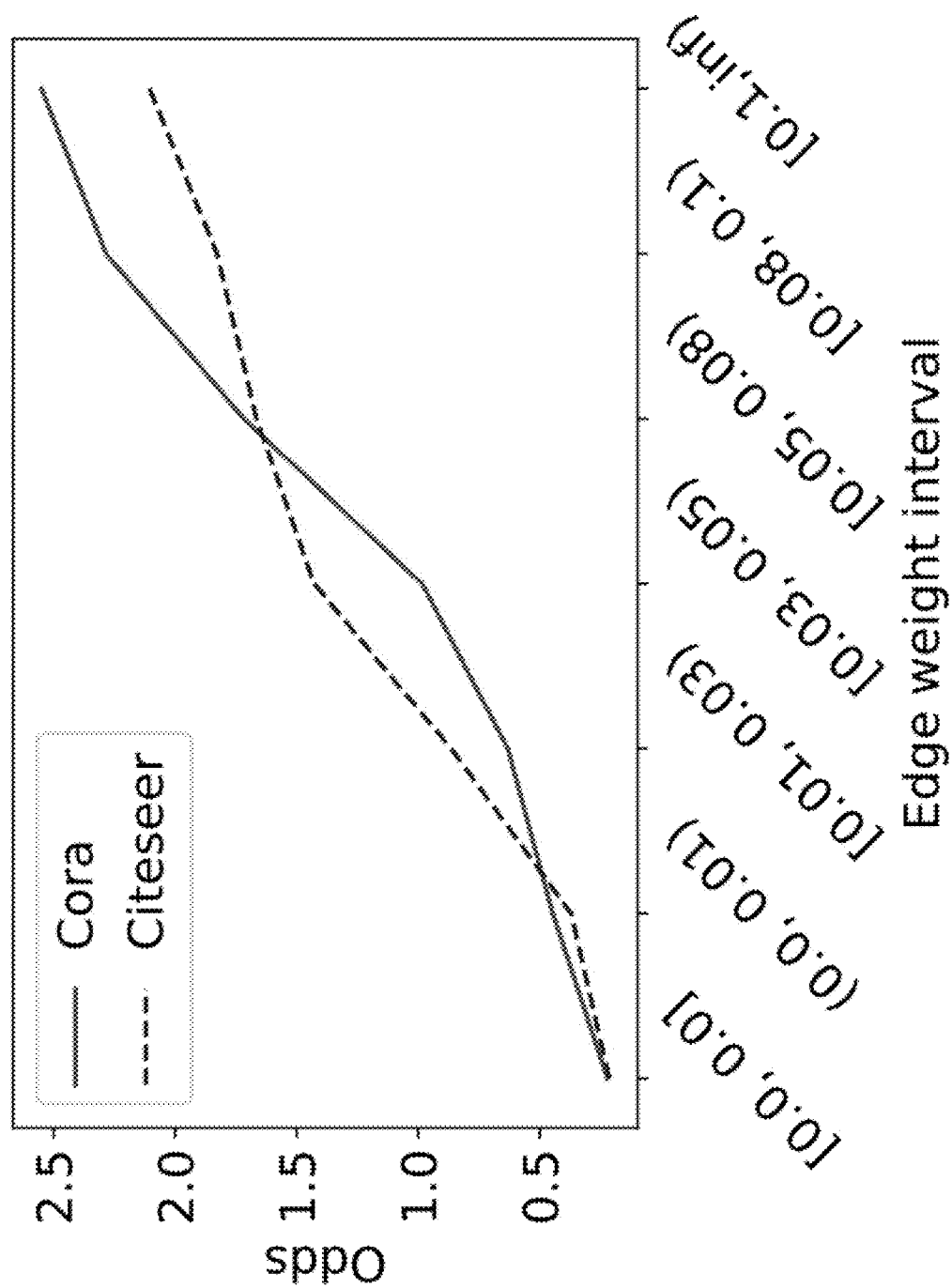
Figure 7G:
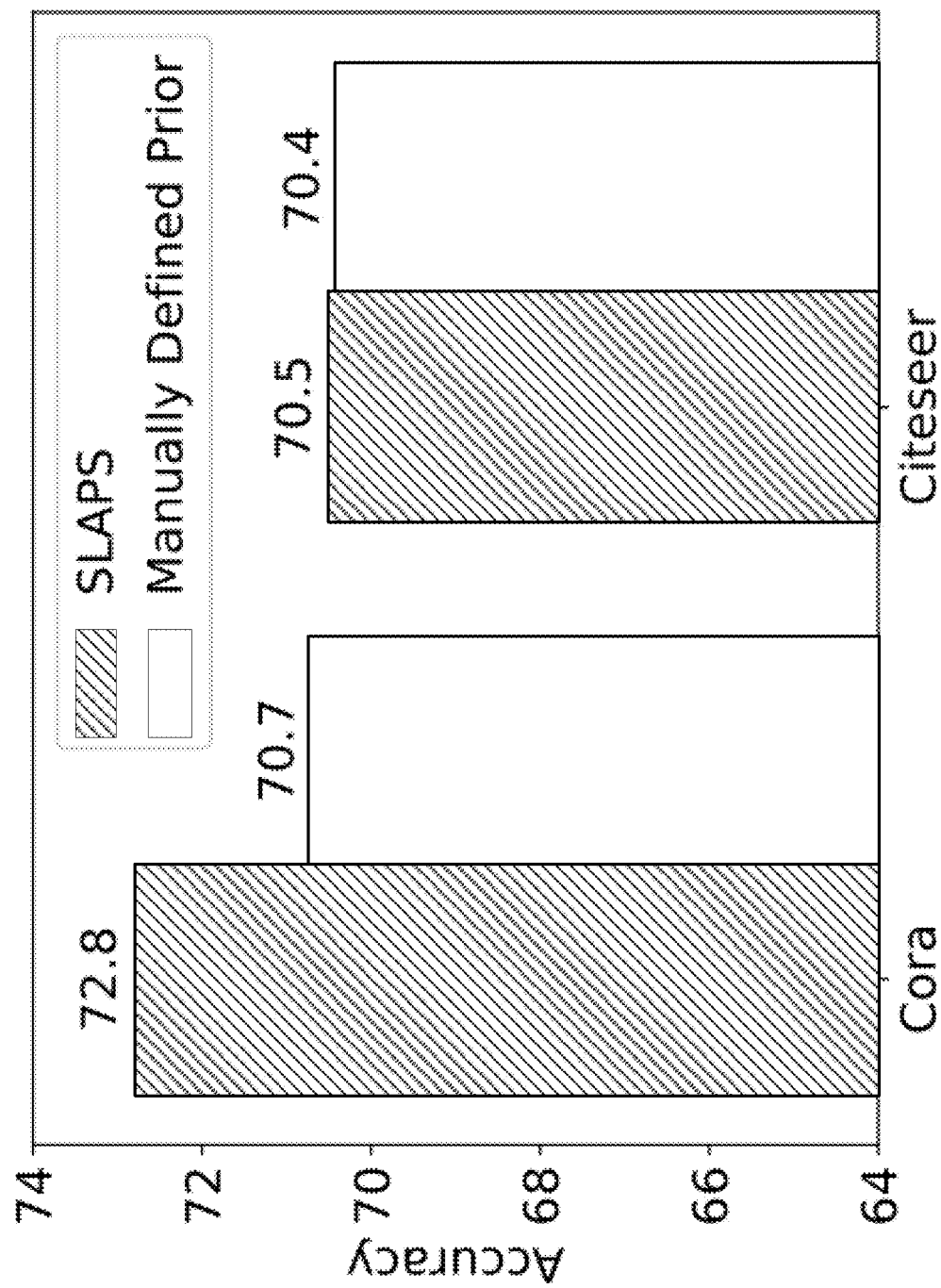

The results are shown in FIG. 7G. According to the results, regularizing toward a manually designed $A^{prior}$ also provides good results but falls short of SLAPS with self-supervision. The superiority of the self-supervised approach compared to the manual design could be due to two reasons enunciated below.

First, some of the node features may be redundant (e.g., they may be derived from other features) or highly correlated. These features can negatively affect the similarity computations for the prior graph in $A^{prior}$. As an example, consider three nodes with seven binary features [0,0,0,1,1,1,1], [0,0,0,0,0,0,0] and [1,1,1,1,1,1,1] respectively and assume the last two features for each node are always equivalent and are computed based on a logical and of the 4th and 5th features. For the first node in the example, the 4th and 5th features are both 1 so their logical and is also 1 and so the last two features for this node are both 1. The computation for the other two nodes is similar.

Without these two features, the first node is more similar to the second than the third node, but when considering these derived features, it becomes more similar to the third node. This change in node similarities affects the construction of $A^{prior}$ which can deteriorate the overall performance of the model. The version of SLAPS with the self-supervised task, on the other hand, is not affected by this problem as much because the model can learn to predict the derived node features based on other features and without heavily relying on the graph structure.

Second, while many graph structures may be appropriate for predicting the node features, in the manual approach, only one particular such structure is regularized. Using the self-supervised task, however, SLAPS can learn any of those structures; ideally, it learns the one that is more suited for the downstream task due to the extra supervision coming from the downstream task.

The results of SLAPS and the baselines on the benchmarks are reported in tables shown in FIGS. 4C and 4D. Referring now to FIG. 4C, starting with the baselines, learning a fully connected graph in MLP-GAM* outperforms MLP. kNN-GCN significantly outperforms MLP on Cora and Citeseer but underperforms on Pubmed and ogbn-arxiv. Furthermore, both self-training and AdaEdge improve the performance of kNN-GCN. This shows the importance of the similarity metric and the graph structure that is fed into GCN; a low-quality structure can harm model performance. LDS outperforms MLP but the fully parameterized adjacency matrix of LDS results in memory issues for Pubmed and ogbn-arxiv. As for GRCN, it can revise a good initial adjacency matrix and provide a substantial boost in performance. However, as evidenced by the results, if the initial graph structure is somewhat poor, GRCN's performance becomes on par with kNN-GCN. IDGL is the best performing baseline.

SLAPS consistently outperforms the baselines in some cases by large margins. Among the generators, the winner is dataset-dependent with MLP-D, which mostly outperforms MLP on datasets with many features, and MLP outperforms on datasets with small numbers of features. The baselines that learn a graph structure fail on ogbn-arxiv; the implementation of example embodiments of structure learning model 140, on the other hand, scales to such large graphs. Adding self-training helps further improve the results of SLAPS. Adding AdaEdge, however, does not seem effective, probably because the graph structure learned by SLAPS already exhibits a high degree of homophily.

FIG. 4D shows results on classification datasets. † indicates results have been taken from [10]. Bold and underlined values indicate best and second-best mean performances respectively. In FIG. 4D, SLAPS is compared with the best performing baselines from FIG. 4C (kNN-GCN, LDS and IDGL). An MLP baseline is also included for comparison. On three out of four datasets, SLAPS outperforms the LDS and IDGL baselines. For the Digits dataset, interestingly kNN-GCN outperforms the learning-based models. This could be because the initial kNN structure for this dataset is already a good structure. Among the datasets on which SLAPS can be trained with the FP generator, 20news has the largest number of nodes (9,607 nodes). On this dataset, it is observed that an FP generator suffers from overfitting and produces weaker results compared to other generators due to its large number of parameters.

To provide more insight into the value provided by the self-supervision task and the generalizability of the adjacency matrix learned through this task, experiments with $SLAPS_{2s}$ are conducted. Recall that in $SLAPS_{2s}$, the adjacency matrix is learned only based on the self-supervision task and the node labels are only used for early stopping, hyperparameter tuning, and training $GCN_C$. FIG. 7A shows the performance of SLAPS and $SLAPS_{2s}$ on Cora and compares them with kNN-GCN. Although $SLAPS_{2s}$ does not use the node labels in learning an adjacency matrix, it outperforms kNN-GCN (8.4% improvement when using an FP generator). With an FP generator, $SLAPS_{2s}$ even achieves competitive performance with SLAPS; this is mainly because FP does not leverage the supervision provided by $GCN_C$ toward learning generalizable patterns that can be used for nodes other than those in the training set. These results corroborate the effectiveness of the self-supervision task for learning an adjacency matrix. Furthermore, the results show that learning the adjacency using both self-supervision and the task-specific node labels results in higher predictive accuracy.

FIG. 7B shows the performance of SLAPS with MLP graph generator as a function of $\lambda$. The generator used in this experiment is MLP; other generators produced similar results. When $\lambda=0$, corresponding to the absence of self-supervision, the model performance is somewhat poor. As soon as $\lambda$ becomes positive, both models see a large boost in performance showing that self-supervision is helpful to the high performance of SLAPS. Increasing $\lambda$ further provides larger boosts until it becomes so large that the self-supervision loss dominates the classification loss and the performance deteriorates.

According to Theorem 1, a smaller q (corresponding to the training set size) results in more starved edges in each epoch. To explore the effect of self-supervision as a function of q, SLAPS are compared with and without supervision on Cora and Citeseer while reducing the number of labeled nodes per class from 20 to 5. The FP generator is used for this experiment. With 5 labeled nodes per class, adding self-supervision provides 16.7% and 22.0% improvements on Cora and Citeseer respectively, which is substantially higher than the corresponding numbers when using 20 labeled nodes per class (10.0% and 7.0% respectively). This provides empirical evidence for Theorem 1. Note that the results on Cora390 and Citeseer 370 datasets provide evidence that the self-supervised task is effective even when the label rate is high.

The performance of GNNs highly depends on the quality of the input graph structure and deteriorates when the graph structure is noisy [see 56, 7, 9]. Here, whether self-supervision is also helpful when a noisy structure is provided as input is explored. Cora and Citeseer are used to provide noisy versions of the input graph as input. The provided noisy graph structure is used only for initialization; it is then further optimized by SLAPS. The graph structure is perturbed by replacing ρ percent of the edges in the original structure (selected uniformly at random) with random edges. FIG. 7E shows performance comparison when noisy graphs are provided as input (ρ indicates the percentage of perturbations). It shows the performance of SLAPS with and without self-supervision (λ=0 corresponds to no supervision). Results of vanilla GCN on these perturbed graphs are also shown for comparison. It can be viewed that self-supervision consistently provides a boost in performance especially for higher values of ρ.

Following the experiments above, the learned and original structures are compared by measuring the number of random edges added during perturbation, but removed by the model and the number of edges removed during the perturbation but recovered by the model. For Cora, SLAPS removed 76.2% and 70.4% of the noisy edges and recovered 58.3% and 44.5% of the removed edges for ρ=25% and ρ=50% respectively, while SLAPS with λ=0 only removed 62.8% and 54.9% of the noisy edges and recovered 51.4% and 35.8% of the removed edges. This provides evidence on self-supervision being helpful for structure learning.

As explained earlier, a properly learned graph for semi-supervised classification with GNNs exhibits high homophily. To verify the quality of the learned adjacency with respect to homophily, for every pair of nodes in the test set, the odds of the two nodes sharing the same label are computed as a function of the normalized weight of the edge connecting them. FIG. 7F represents the odds for different weight intervals (recall that A is row and column normalized). It shows the odds of two nodes in the test set sharing the same label as a function of the edge weights learned by SLAPS. For both Cora and Citeseer, nodes connected with higher edge weights are more likely to share the same label compared to nodes with lower or zero edge weights. Specifically, when $A_{ij} \geq 0.1$, $\mathcal{V}_i$ and $\mathcal{V}_j$ are almost 2.5 and 2.0 times more likely to share the same label on Cora and Citeseer respectively.

A comparison between the learned graph structures using SLAPS (or other baselines) and the original graph structure of the available datasets may not be sensible. The goal of structure learning for semi-supervised classification with graph neural networks is to learn a structure with a high degree of homophily. Following [19], the edge homophily ratio can be defined as the fraction of edges in the graph that connect nodes that have the same class label.

Figure 8A:
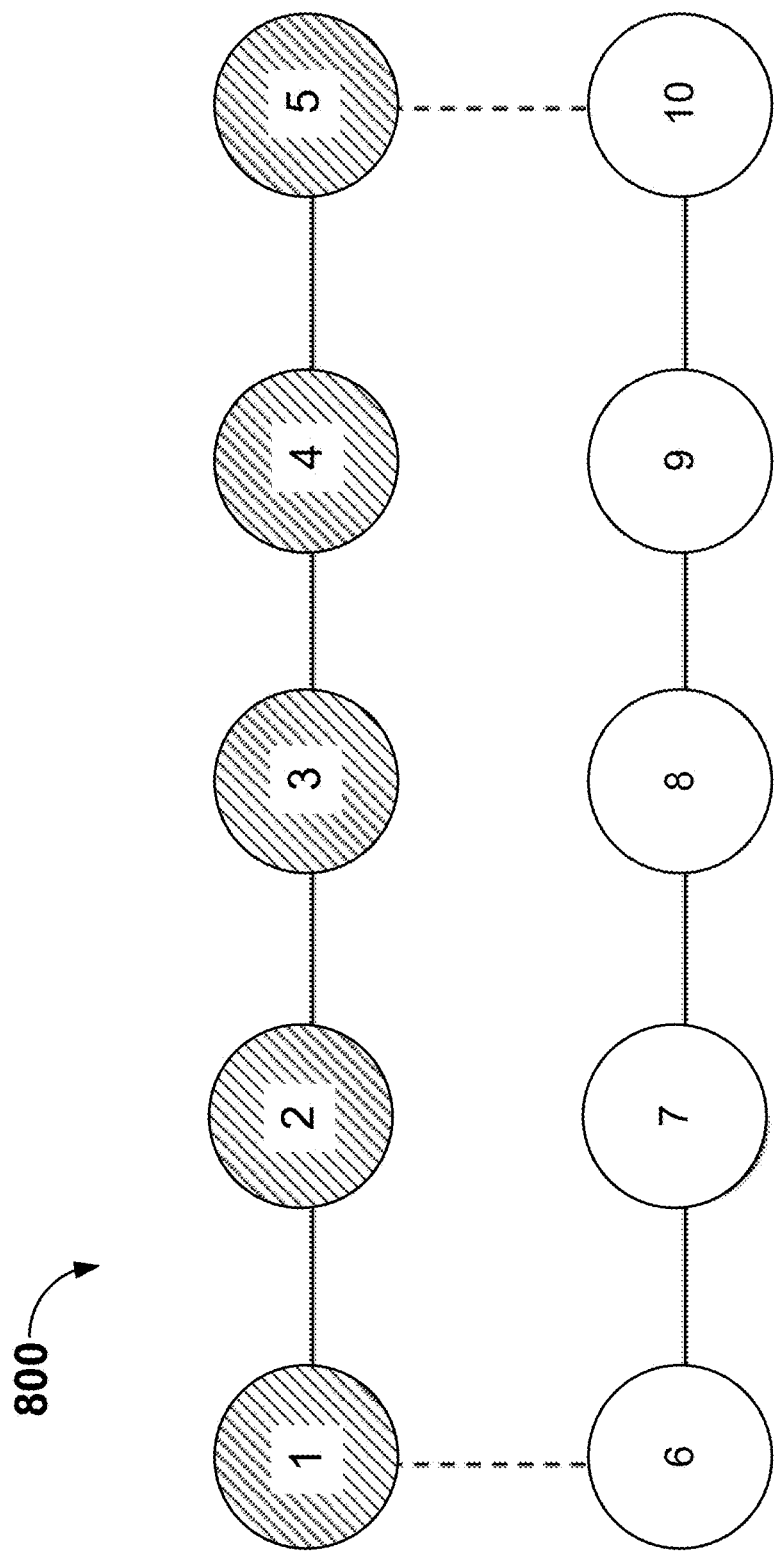
FIGS. 8A and 8B show two graphs exhibit the same degree of homophily.
Figure 8B:
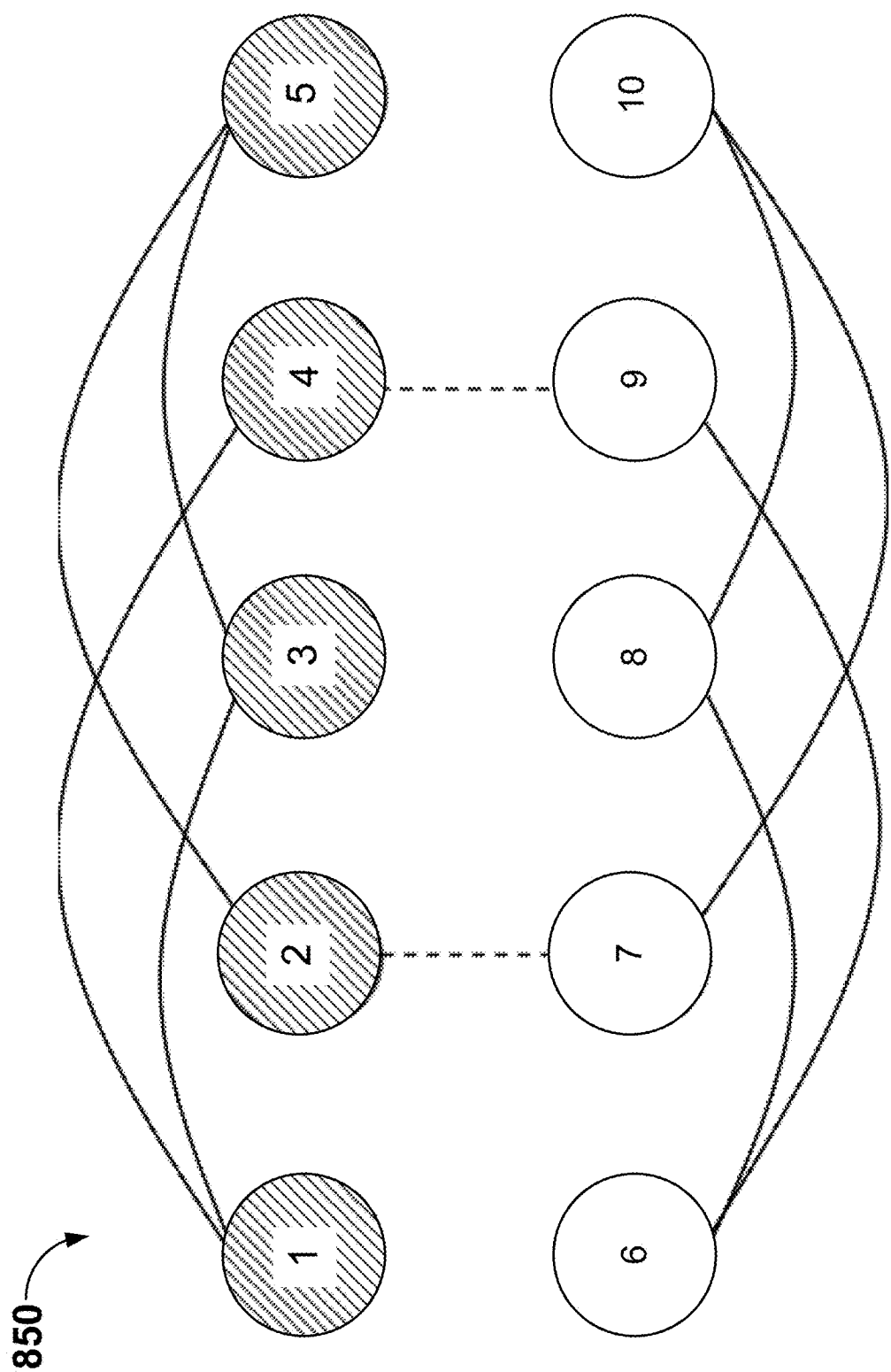

FIGS. 8A and 8B demonstrate an example where two graph structures 800, 850 for the same set of nodes have the same edge homophily ratio (0.8 for both) but have no edges in common. Node colors indicates the class labels. Solid lines indicate homophilous edges and dashed lines indicate non-homophilous edges. As shown, two graphs exhibit the same degree of homophily yet there is not overlap between their edges.

It is possible that the original graph structure (e.g., the citation graph in Cora) corresponds to the structure on the left but SLAPS (or any other model) learns the graph on the right, or vice versa. While both these structures may be equally good, they do not share any edges. Therefore, measuring the quality of the learned graph using SLAPS by comparing it to the original graph of the datasets may not be sensible. However, if a noisy version of the initial structure is provided as input for SLAPS, then one may expect that SLAPS recovers a structure similar to the cleaned original graph, as demonstrated in this disclosure.

Limitations of the structure learning model 140 exist. Firstly, in cases where nodes do not have input features but an initial noisy structure of the nodes is available, the self-supervised task cannot be readily applied. One possible solution is to first run an unsupervised node embedding model such as DeepWalk [15] to obtain node embeddings, then treat these embeddings as node features and run SLAPS. Secondly, the FP graph generator is not applicable in the inductive setting; this is because FP directly optimizes the adjacency matrix. However, the other two graph generators (MLP and MLP-D) can be applied in the inductive setting.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

Embodiments performing the operations for anomaly detection and anomaly scoring provide certain advantages over manually assessing anomalies. For example, in some embodiments, all data points are assessed, which eliminates subjectivity involved in judgement-based sampling, and may provide more statistically significant results than random sampling. Further, the outputs produced by embodiments of system are reproducible and explainable.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

REFERENCES

[1] Mikhail Belkin, Partha Niyogi, and Vikas Sindhwani. Manifold regularization: A geometric framework for learning from labeled and unlabeled examples. JMLRR, 7(November):2399-2434, 2006.

[2] Ines Chami, Sami Abu-El-Haija, Bryan Perozzi, Christopher Ré, and Kevin Murphy. Machine learning on graphs: A model and comprehensive taxonomy. arXiv preprint arXiv:2005.03675, 2020.

[3] Deli Chen, Yankai Lin, Wei Li, Peng Li, Jie Zhou, and Xu Sun. Measuring and relieving the over-smoothing problem for graph neural networks from the topological view. In Proceedings of the AAAI Conference on Artificial Intelligence, volume 34, pages 3438-3445, 2020.

[4] Yu Chen, Lingfei Wu, and Mohammed J. Zaki. Deep iterative and adaptive learning for graph neural networks. In The First International Workshop on Deep Learning on Graphs: Methodologies and Applications (with AAAI), February 2020. URL https://dlg2019.bitbucket.io/aaai20.

[5] Krzysztof Choromanski, Valerii Likhosherstov, David Dohan, Xingyou Song, Andreea Gane, Tamas Sarlos, Peter Hawkins, Jared Davis, Afroz Mohiuddin, Lukasz Kaiser, et al. Rethinking attention with performers. arXiv preprint arXiv:2009.14794, 2020.

[6] Luca Cosmo, Anees Kazi, Seyed-Ahmad Ahmadi, Nassir Navab, and Michael Bronstein. Latent patient network learning for automatic diagnosis. arXiv preprint arXiv:2003.13620, 2020.

[7] Hanjun Dai, Hui Li, Tian Tian, Xin Huang, Lin Wang, Jun Zhu, and Le Song. Adversarial attack on graph structured data. arXiv preprint arXiv:1806.02371, 2018.

[8] Paul Erdo"s and Alfred Rényi. On random graphs. Publicationes Mathematicae Debrecen, 6: 290-297, 1959.

[9] James Fox and Sivasankaran Rajamanickam. How robust are graph neural networks to structural noise? arXiv preprint arXiv:1912.10206, 2019.

[10] Luca Franceschi, Mathias Niepert, Massimiliano Pontil, and Xiao He. Learning discrete structures for graph neural networks. In ICML, 2019.

[11] Victor Garcia and Joan Bruna. Few-shot learning with graph neural networks. arXiv preprint arXiv:1711.04043, 2017.

[12] Spyros Gidaris and Nikos Komodakis. Generating classification weights with gnn denoising autoencoders for few-shot learning. In Proceedings of the IEEE Conference on Computer Vision and Pattern Recognition, pages 21-30, 2019.

[13] Jonathan Halcrow, Alexandru Mosoi, Sam Ruth, and Bryan Perozzi. Grale: Designing networks for graph learning. In Proceedings of the 26th ACM SIGKDD International Conference on Knowledge Discovery & Data Mining, pages 2523-2532, 2020.

[14] Weihua Hu, Matthias Fey, Marinka Zitnik, Yuxiao Dong, Hongyu Ren, Bowen Liu, Michele Catasta, and Jure Leskovec. Open graph benchmark: Datasets for machine learning on graphs. arXiv preprint arXiv:2005.00687, 2020.

[15] Weihua Hu, Bowen Liu, Joseph Gomes, Marinka Zitnik, Percy Liang, Vijay Pande, and Jure Leskovec. Strategies for pre-training graph neural networks. In ICLR, 2020.

[16] Ziniu Hu, Yuxiao Dong, Kuansan Wang, Kai-Wei Chang, and Yizhou Sun. Gpt-gnn: Generative pre-training of graph neural networks. In Proceedings of the 26th ACM SIGKDD International Conference on Knowledge Discovery & Data Mining, pages 1857-1867, 2020.

[17] Soobeom Jang, Seong-Eun Moon, and Jong-Seok Lee. Brain signal classification via learning connectivity structure. arXiv preprint arXiv:1905.11678, 2019.

[18] Bo Jiang, Ziyan Zhang, Doudou Lin, Jin Tang, and Bin Luo. Semi-supervised learning with graph learning-convolutional networks. In Proceedings of the IEEE/CVF Conference on Computer Vision and Pattern Recognition, pages 11313-11320, 2019.

[19] Djork-Arné Clevert, Thomas Unterthiner, and Sepp Hochreiter. Fast and accurate deep network learning by exponential linear units (elus). arXiv preprint arXiv:1511.07289, 2015.

[20] Wei Jin, Tyler Derr, Haochen Liu, Yiqi Wang, Suhang Wang, Zitao Liu, and Jiliang Tang. Self-supervised learning on graphs: Deep insights and new direction. arXiv preprint arXiv:2006.10141, 2020.

[21] Wei Jin, Yao Ma, Xiaorui Liu, Xianfeng Tang, Suhang Wang, and Jiliang Tang. Graph structure learning for robust graph neural networks. arXiv preprint arXiv:2005.10203, 2020.

[22] Daniel D Johnson, Hugo Larochelle, and Daniel Tarlow. Learning graph structure with a finite-state automaton layer. arXiv preprint arXiv:2007.04929, 2020.

[23] Seyed Mehran Kazemi, Rishab Goel, Kshitij Jain, Ivan Kobyzev, Akshay Sethi, Peter Forsyth, and Pascal Poupart. Representation learning for dynamic graphs: A survey. JMLR, 2020.

[24] Thomas N. Kipf and Max Welling. Semi-supervised classification with graph convolutional networks. In ICLR, 2017.

[25] Yann LeCun, Corinna Cortes, and CJ Burges. MNIST handwritten digit database. ATT Labs [Online]. Available: http://yann.lecun.com/exdb/mnist, 2, 2010.

[26] Qimai Li, Zhichao Han, and Xiao-Ming Wu. Deeper insights into graph convolutional networks for semi-supervised learning. In AAAI, 2018.

[27] Ruoyu Li, Sheng Wang, Feiyun Zhu, and Junzhou Huang. Adaptive graph convolutional neural networks. arXiv preprint arXiv:1801.03226, 2018.

[28] Renjie Liao, Yujia Li, Yang Song, Shenlong Wang, Charlie Nash, William L Hamilton, David Duvenaud, Raquel Urtasun, and Richard S Zemel. Efficient graph generation with graph recurrent attention networks. arXiv preprint arXiv:1910.00760, 2019.

[29] Jenny Liu, Aviral Kumar, Jimmy Ba, Jamie Kiros, and Kevin Swersky. Graph normalizing flows. In NeurIPS, pages 13556-13566, 2019.

[30] Vinod Nair and Geoffrey E Hinton. Rectified linear units improve restricted boltzmann machines. In ICML, 2010.

[31] Kenta Oono and Taiji Suzuki. Graph neural networks exponentially lose expressive power for node classification. In ICLR, 2020.

[32] Fabian Pedregosa, Gaël Varoquaux, Alexandre Gramfort, Vincent Michel, Bertrand Thirion, Olivier Grisel, Mathieu Blondel, Peter Prettenhofer, Ron Weiss, Vincent Dubourg, et al. Scikit-learn: Machine learning in python. JMLR, 12:2825-2830, 2011.

[33] Shah Rukh Qasim, Jan Kieseler, Yutaro Iiyama, and Maurizio Pierini. Learning representations of irregular particle-detector geometry with distance-weighted graph networks. The European Physical Journal C, 79(7):1-11, 2019.

[34] Sam T Roweis and Lawrence K Saul. Nonlinear dimensionality reduction by locally linear embedding. science, 290(5500):2323-2326, 2000.

[35] Franco Scarselli, Marco Gori, Ah Chung Tsoi, Markus Hagenbuchner, and Gabriele Monfardini. The graph neural network model. IEEE Transactions on Neural Networks, 20(1):61-80, 2008.

[36] Prithviraj Sen, Galileo Namata, Mustafa Bilgic, Lise Getoor, Brian Galligher, and Tina Eliassi-Rad. Collective classification in network data. AI magazine, 29(3):93-93, 2008.

[37] Otilia Stretcu, Krishnamurthy Viswanathan, Dana Movshovitz-Attias, Emmanouil Platanios, Sujith Ravi, and Andrew Tomkins. Graph agreement models for semi-supervised learning. In NeurIPS, pages 8713-8723, 2019.

[38] Mohammed Suhail and Leonid Sigal. Mixture-kernel graph attention network for situation recognition. In Proceedings of the IEEE International Conference on Computer Vision, pages 10363-10372, 2019.

[39] Joshua B Tenenbaum, Vin De Silva, and John C Langford. A global geometric framework for nonlinear dimensionality reduction. science, 290(5500):2319-2323, 2000.

[40] Petar Velic̆kovic', Guillem Cucurull, Arantxa Casanova, Adriana Romero, Pietro Lio, and Yoshua Bengio. Graph attention networks. In ICLR, 2018.

[41] Pascal Vincent, Hugo Larochelle, Yoshua Bengio, and Pierre-Antoine Manzagol. Extracting and composing robust features with denoising autoencoders. In ICML, pages 1096-1103, 2008.

[42] Yue Wang, Yongbin Sun, Ziwei Liu, Sanjay E Sarma, Michael M Bronstein, and Justin M Solomon. Dynamic graph cnn for learning on point clouds. Acm Transactions On Graphics (tog), 38(5):1-12, 2019.

[43] Xuan Wu, Lingxiao Zhao, and Leman Akoglu. A quest for structure: Jointly learning the graph structure and semi-supervised classification. In CIKM, pages 87-96, 2018.

[44] Liang Yang, Zesheng Kang, Xiaochun Cao, Di Jin, Bo Yang, and Yuanfang Guo. Topology optimization based graph convolutional network. In IJCAI, pages 4054-4061, 2019.

[45] Jiaxuan You, Rex Ying, Xiang Ren, William L Hamilton, and Jure Leskovec. Graphrnn: Generating realistic graphs with deep auto-regressive models. arXiv preprint arXiv:1802.08773, 2018.

[46] Yuning You, Tianlong Chen, Zhangyang Wang, and Yang Shen. When does self-supervision help graph convolutional networks? arXiv preprint arXiv:2006.09136, 2020.

[47] Donghan Yu, Ruohong Zhang, Zhengbao Jiang, Yuexin Wu, and Yiming Yang. Graph-revised convolutional network. In ECML PKDD, 2020.

[48] Jiani Zhang, Xingjian Shi, Junyuan Xie, Hao Ma, Irwin King, and Dit-Yan Yeung. Gaan: Gated attention networks for learning on large and spatiotemporal graphs. arXiv preprint arXiv:1803.07294, 2018.

[49] Jiawei Zhang, Haopeng Zhang, Congying Xia, and Li Sun. Graph-bert: Only attention is needed for learning graph representations. arXiv preprint arXiv:2001.05140, 2020.

[50] Tong Zhao, Yozen Liu, Leonardo Neves, Oliver Woodford, Meng Jiang, and Neil Shah. Data augmentation for graph neural networks. arXiv preprint arXiv: 2006.06830, 2020.

[51] Hao Zhu, Yankai Lin, Zhiyuan Liu, Jie Fu, Tat-seng Chua, and Maosong Sun. Graph neural networks with generated parameters for relation extraction. arXiv preprint arXiv:1902.00756, 2019.

[52] Jiong Zhu, Yujun Yan, Lingxiao Zhao, Mark Heimann, Leman Akoglu, and Danai Koutra. Beyond homophily in graph neural networks: Current limitations and effective designs. Advances in Neural Information Processing Systems, 33, 2020.

[53] Qikui Zhu, Bo Du, and Pingkun Yan. Self-supervised training of graph convolutional networks. arXiv preprint arXiv:2006.02380, 2020.

[54] Xiaojin Zhu and Zoubin Ghahramani. Learning from labeled and unlabeled data with label propagation. 2002.

[55] Yanqiao Zhu, Weizhi Xu, Jinghao Zhang, Qiang Liu, Shu Wu, and Liang Wang. Deep graph structure learning for robust representations: A survey. arXiv preprint arXiv:2103.03036, 2021.

[56] Daniel Zügner, Amir Akbarnejad, and Stephan Günnemann. Adversarial attacks on neural networks for graph data. In Proceedings of the 24th ACM SIGKDD International Conference on Knowledge Discovery & Data Mining, pages 2847-2856, 2018.

[57] Diederik P Kingma and Jimmy Ba. Adam: A method for stochastic optimization. arXiv preprint arXiv: 1412.6980, 2014.

[58] Nikita Kitaev, Łukasz Kaiser, and Anselm Levskaya. Reformer: The efficient transformer. arXiv preprint arXiv:2001.04451, 2020.

[59] Guohao Li, Matthias Muller, Ali Thabet, and Bernard Ghanem. Deepgcns: Can gcns go as deep as cnns? In Proceedings of the IEEE/CVF International Conference on Computer Vision, pages 9267-9276, 2019.

[60] Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. In NIPS-W, 2017.

[61] Bryan Perozzi, Rami Al-Rfou, and Steven Skiena. Deepwalk: Online learning of social representations. In Proceedings of the 20th ACM SIGKDD international conference on Knowledge discovery and data mining, pages 701-710, 2014.

[62] Minjie Wang, Lingfan Yu, Da Zheng, Quan Gan, Yu Gai, Zihao Ye, Mufei Li, Jinjing Zhou, Qi Huang, Chao Ma, et al. Deep graph library: Towards efficient and scalable deep learning on graphs. arXiv preprint arXiv: 1909.01315, 2019.

[63] Xiaojin Zhu, Zoubin Ghahramani, and John D Lafferty. Semi-supervised learning using Gaussian fields and harmonic functions. In Proceedings of the 20th International conference on Machine learning (ICML-03), pages 912-919, 2003.

What is claimed is:

1. A computer-implemented system for generating a graph structure represented as an adjacency matrix, the system comprising:
at least one processor; and
memory in communication with said at least one processor, wherein the memory stores instructions, when executed at said at least one processor, causes said system to:
generate the adjacency matrix based on a plurality of node features;
generate a plurality of noisy node features based on the plurality of node features;
generate a plurality of denoised node features using a first neural network based on the plurality of noisy node features and the adjacency matrix; wherein the first neural network comprises a denoising autoencoder (DAE) having a loss function which is a function of elements of the plurality of node features to which noise has been added, the adjacency matrix, parameters of the first neural network, and the plurality of noisy node features;
compute, using a second neural network, one or more class labels based on the plurality of node features and the adjacency matrix;
update the adjacency matrix based on the plurality of denoised node features;
generate the graph structure using the updated adjacency matrix; and generate, by the first neural network based on the generated graph structure, prediction tasks at the node-level, edge-level and graph-level of the generated graph structure.

2. The system of claim 1, wherein the adjacency matrix is a normalized adjacency matrix.

3. The system of claim 1, wherein the first neural network comprises a graph neural network (GNN).

4. The system of claim 1, wherein the first neural network $GNN_{DAE}$ has a loss function $\mathcal{L}_{DAE}$ determined based on the plurality of noisy node features and the parameters of the first neural network $GNN_{DAE}$.

5. The system of claim 4, wherein the loss function $\mathcal{L}_{DAE}$ is represented by the function $$\mathcal{L}_{DAE}=L(X_{idx}, GNN_{DAE}(\tilde{X}, A; \theta_{GNN_{DAE}})_{idx}), \text{ and}$$

wherein A represents the generated adjacency matrix, $\theta_{GNN_{DAE}}$ represents the parameters of the first neural network $GNN_{DAE}$, X represents the plurality of node features, $\tilde{X}$ represents the plurality of noisy node features, idx represent indices corresponding to the elements of X to which noise has been added, and $X_{idx}$ represent corresponding values of elements at idx.

6. The system of claim 4, wherein the instructions when executed at said at least one processor causes said system to update one or more parameters of the first neural network $GNN_{DAE}$ by minimizing the loss function $\mathcal{L}_{DAE}$.

7. The system of claim 4, wherein the loss function $\mathcal{L}_{DAE}$ is determined based on a binary cross-entropy loss or a mean-squared error loss.

8. The system of claim 4, wherein the instructions when executed at said at least one processor causes said system to update one or more parameters of the first and second neural networks by minimizing a combined loss determined based on $\mathcal{L}_C$ and $\mathcal{L}_{DAE}$, wherein $\mathcal{L}_C$ represents a loss function of the second neural network.

9. The system of claim 1, wherein generating the adjacency matrix is based on a multi-layer perceptron (MLP) with k nearest neighbors.

10. The system of claim 9, wherein generating the adjacency matrix is performed by a generator function $G: \mathbb{R}^{n \times f} \rightarrow \mathbb{R}^{n \times n}$ with parameters $\theta_G$, wherein the generator function G is configured to receive the plurality of node features $X \in$ $\mathbb{R}^{n \times f}$ as input and to output the adjacency matrix $\tilde{A} \in \mathbb{R}^{n \times n}$, and the parameters $\theta_G$ corresponds to weights of the MLP: $\mathbb{R}^{n \times f} \to \mathbb{R}^{n \times n}$.

11. A computer-implemented method for generating a graph structure represented as an adjacency matrix, the method comprising:
generating the adjacency matrix based on a plurality of node features;
generating a plurality of noisy node features based on the plurality of node features;
generating a plurality of denoised node features using a first neural network based on the plurality of noisy node features and the adjacency matrix wherein the first neural network comprises a denoising autoencoder (DAE) having a loss function which is a function of elements of the plurality of node features to which noise has been added, the adjacency matrix, parameters of the first neural network, and the plurality of noisy node features;
compute, using a second neural network, one or more class labels based on the plurality of node features and the adjacency matrix;
updating the adjacency matrix based on the plurality of denoised node features;
generating the graph structure using the updated adjacency matrix; and generating, by the first neural network based on the generated graph structure, prediction tasks at the node-level, edge-level and graph-level of the generated graph structure.

12. The method of claim 11, wherein the adjacency matrix is a normalized adjacency matrix.

13. The method of claim 11, wherein the first neural network comprises a graph neural network (GNN).

14. The method of claim 11, wherein the first neural network $GNN_{DAE}$ has a loss function $\mathcal{L}_{DAE}$ determined based on the plurality of noisy node features and the parameters of the first neural network $GNN_{DAE}$.

15. The method of claim 14, wherein the loss function $\mathcal{L}_{DAE}$ is represented by the function $$\mathcal{L}_{DAE} = L(X_{idx}, GNN_{DAE}(\tilde{X}, A; \theta_{GNN_{DAE}})_{idx}), \text{ and}$$

wherein A represents the generated adjacency matrix, $\theta_{GNN_{DAE}}$ represents the parameters of the first neural network $GNN_{DAE}$, X represents the plurality of node features, $\tilde{X}$ represents the plurality of noisy node features, idx represent indices corresponding to the elements of X to which noise has been added, and $X_{idx}$ represent corresponding values of elements at idx.

16. The method of claim 14, further comprise updating one or more parameters of the first neural network $GNN_{DAE}$ by minimizing the loss function $\mathcal{L}_{DAE}$.

17. The method of claim 14, wherein the loss function $\mathcal{L}_{DAE}$ is determined based on a binary cross-entropy loss or a mean-squared error loss.

18. The method of claim 14, further comprising: updating one or more parameters of the first and second neural networks by minimizing a combined loss determined based on $\mathcal{L}_C$ and $\mathcal{L}_{DAE}$, wherein $\mathcal{L}_C$ represents a loss function of the second neural network.

19. The method of claim 11, wherein generating the adjacency matrix is based on a multi-layer perceptron (MLP) with k nearest neighbors.

20. A non-transitory computer-readable storage medium storing a data model representing a neural network for generating a graph structure, wherein the neural network is trained by:
generating an adjacency matrix based on a plurality of node features;
generating a plurality of noisy node features based on the plurality of node features;
generating a plurality of denoised node features using the neural network based on the plurality of noisy node features and the adjacency matrix wherein the neural network comprises a denoising autoencoder (DAE) having a loss function which is a function of elements of the plurality of node features to which noise has been added, the adjacency matrix, parameters of the first neural network, and the plurality of noisy node features;
compute, using a second neural network, one or more class labels based on the plurality of node features and the adjacency matrix;
updating the adjacency matrix based on the plurality of denoised node features;
generating the graph structure using the updated adjacency matrix; and generating, by the first neural network based on the generated graph structure, prediction tasks at the node-level, edge-level and graph-level of the generated graph structure.

21. The computer-readable storage medium of claim 20, wherein the storage medium further stores the adjacency matrix updated by the neural network.

* * * * *